(12) United States Patent
Luo et al.

(10) Patent No.: US 9,765,219 B2
(45) Date of Patent: *Sep. 19, 2017

(54) POLYARYLENE SULFIDE COMPONENTS FOR HEAVY DUTY TRUCKS

(71) Applicant: Ticona LLC, Florence, KY (US)

(72) Inventors: Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/804,286

(22) Filed: Mar. 14, 2013

(65) Prior Publication Data
US 2013/0273286 A1 Oct. 17, 2013

Related U.S. Application Data

(60) Provisional application No. 61/623,618, filed on Apr. 13, 2012, provisional application No. 61/665,619, (Continued)

(51) Int. Cl.
B32B 1/08 (2006.01)
C08L 81/04 (2006.01)
(Continued)

(52) U.S. Cl.
CPC .............. *C08L 81/04* (2013.01); *B32B 1/08* (2013.01); *B32B 5/022* (2013.01); *B32B 5/024* (2013.01);
(Continued)

(58) Field of Classification Search
CPC .......... B32B 1/08; B32B 15/08; B32B 31/08; B32B 2262/0269; B32B 2270/00;
(Continued)

(56) References Cited

U.S. PATENT DOCUMENTS 3,354,129 A 11/1967 Edmonds, Jr. et al.
3,610,698 A 10/1971 Gachot et al.
(Continued)

FOREIGN PATENT DOCUMENTS

CA 2032370 6/1991
EP 0900650 3/1999
(Continued)

OTHER PUBLICATIONS

International Search Report and Written Opinion for PCT/US2013/031315 dated Apr. 25, 2014, 10 pages.
(Continued)

*Primary Examiner* — Yan Lan
(74) *Attorney, Agent, or Firm* — Dority & Manning, P.A.

(57) ABSTRACT

Components for heavy duty trucks are described that exhibit high strength and flexibility. The components are formed from a polyarylene sulfide that exhibits high strength and flexibility characteristics. Methods for forming the components are also described. Formation methods include dynamic vulcanization of a polyarylene sulfide composition that includes an impact modifier dispersed throughout the polyarylene sulfide. A crosslinking agent is combined with the other components of the composition following dispersal of the impact modifier throughout the composition. The heavy duty truck components can include tubular member such as pipes and hoses that can be utilized in exhaust systems, charge air systems, urea tanks, fuel systems, and so forth.

31 Claims, 13 Drawing Sheets

Related U.S. Application Data filed on Jun. 28, 2012, provisional application No. 61/707,377, filed on Sep. 28, 2012, provisional application No. 61/717,910, filed on Oct. 24, 2012.

(51) Int. Cl.

| | | |
|---|---|---|
| C08L 81/02 | (2006.01) | |
| B32B 5/02 | (2006.01) | |
| B32B 5/14 | (2006.01) | |
| B32B 7/12 | (2006.01) | |
| B32B 15/08 | (2006.01) | |
| B32B 25/08 | (2006.01) | |
| B32B 25/14 | (2006.01) | |
| B32B 25/16 | (2006.01) | |
| B32B 27/12 | (2006.01) | |
| B32B 27/18 | (2006.01) | |
| B32B 27/20 | (2006.01) | |
| B32B 27/28 | (2006.01) | |
| B32B 27/30 | (2006.01) | |
| B32B 27/32 | (2006.01) | |
| B32B 27/34 | (2006.01) | |
| F16L 11/08 | (2006.01) | |
| F16L 11/04 | (2006.01) | |

(52) U.S. Cl.
CPC ............ *B32B 5/026* (2013.01); *B32B 5/142* (2013.01); *B32B 7/12* (2013.01); *B32B 15/08* (2013.01); *B32B 25/08* (2013.01); *B32B 25/14* (2013.01); *B32B 25/16* (2013.01); *B32B 27/12* (2013.01); *B32B 27/18* (2013.01); *B32B 27/20* (2013.01); *B32B 27/286* (2013.01); *B32B 27/304* (2013.01); *B32B 27/32* (2013.01); *B32B 27/34* (2013.01); *C08L 81/02* (2013.01); *B32B 2262/0269* (2013.01); *B32B 2270/00* (2013.01); *B32B 2274/00* (2013.01); *B32B 2307/306* (2013.01); *B32B 2307/3065* (2013.01); *B32B 2307/50* (2013.01); *B32B 2307/546* (2013.01); *B32B 2307/558* (2013.01); *B32B 2597/00* (2013.01); *B32B 2605/00* (2013.01); *F16L 11/085* (2013.01); *F16L 2011/047* (2013.01); *Y10T 428/139* (2015.01); *Y10T 428/1393* (2015.01)

(58) Field of Classification Search
CPC ......... B32B 2274/00; B32B 2307/306; B32B 2307/3065; B32B 2307/50; B32B 2307/546; B32B 2307/558; B32B 2597/00; B32B 25/08; B32B 25/14; B32B 25/16; B32B 2605/00; B32B 27/12; B32B 27/18; B32B 27/20; B32B 27/286; B32B 27/304; B32B 27/32; B32B 27/34; B32B 5/022; B32B 5/024; B32B 5/026; B32B 5/142; B32B 7/12; B32B 2307/536; B32B 2307/54; B32B 2307/7265; B32B 27/08; C08L 81/02; C08L 33/068; C08L 81/04; Y10T 428/139; Y10T 428/1393; Y10T 428/2913; Y10T 428/1359; Y10T 428/1352; Y10T 428/31504; F16L 11/00; F16L 9/133; F16L 9/147; F16L 11/086; F16L 2011/047; F27B 14/00
USPC ............ 428/36.9, 36.91, 35.7, 389, 36.92; 264/41; 521/134, 135; 524/502; 525/189; 523/400
See application file for complete search history.

(56) References Cited

U.S. PATENT DOCUMENTS

| | | |
|---|---|---|
| 3,919,177 A | 11/1975 | Campbell |
| 4,337,329 A | 6/1982 | Kubo et al. |
| 4,368,321 A | 1/1983 | Sherk et al. |
| 4,371,671 A | 2/1983 | Anderson |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 2,418,255 A | 8/1987 | Chacko et al. |
| 4,814,430 A | 3/1989 | Iwasaki et al. |
| 4,889,893 A | 12/1989 | Kobayashi et al. |
| 5,006,605 A | 4/1991 | Mizuno et al. |
| 5,015,704 A * | 5/1991 | Takekoshi et al. ........... 525/537 |
| 5,038,833 A | 8/1991 | Brunnnhofer |
| 5,047,465 A | 9/1991 | Auerbach |
| 5,087,666 A | 2/1992 | Yu et al. |
| 5,149,731 A | 9/1992 | Uota et al. |
| 5,240,973 A | 8/1993 | Katoh et al. |
| 5,240,988 A | 8/1993 | Kohler et al. |
| 5,248,730 A | 9/1993 | Yamao |
| 5,270,305 A | 12/1993 | Palmer |
| 5,380,783 A | 1/1995 | Satake et al. |
| 5,397,839 A | 3/1995 | Patel |
| 5,476,120 A | 12/1995 | Brunnhofer |
| 5,504,141 A | 4/1996 | Collard et al. |
| 5,578,679 A | 11/1996 | Suzuki et al. |
| 5,589,544 A | 12/1996 | Horrion |
| 5,625,002 A | 4/1997 | Kadoi et al. |
| 5,652,287 A | 7/1997 | Sullivan et al. |
| 5,654,358 A | 8/1997 | Kadoi et al. |
| 5,654,383 A | 8/1997 | Köhler et al. |
| 5,668,214 A | 9/1997 | Suzuki |
| 5,718,957 A | 2/1998 | Yokoe et al. |
| 5,817,723 A | 10/1998 | Flexman, Jr. et al. |
| 5,830,965 A | 11/1998 | Imaizumi et al. |
| 5,837,758 A | 11/1998 | Brown et al. |
| 5,840,830 A | 11/1998 | Miyahara et al. |
| 5,919,326 A | 7/1999 | Yokoe et al. |
| 6,001,934 A * | 12/1999 | Yamanaka et al. ........... 525/383 |
| 6,015,858 A | 1/2000 | Gornowicz |
| 6,020,431 A | 2/2000 | Venkataswamy et al. |
| 6,117,950 A | 9/2000 | Yamao et al. |
| 6,176,268 B1 | 1/2001 | Hsich et al. |
| 6,225,416 B1 | 5/2001 | Reil et al. |
| 6,281,286 B1 | 8/2001 | Chorvath et al. |
| 6,305,900 B1 * | 10/2001 | Yu ................................. 415/55.1 |
| 6,362,287 B1 | 3/2002 | Chorvath et al. |
| 6,417,293 B1 | 7/2002 | Chorvath et al. |
| 6,443,185 B1 | 9/2002 | Katayama et al. |
| 6,446,673 B1 | 9/2002 | Iio et al. |
| 6,485,806 B1 | 11/2002 | Tateyama et al. |
| 6,523,576 B2 | 2/2003 | Imaeda et al. |
| 6,538,071 B1 | 3/2003 | Fuchs |
| 6,569,955 B1 | 5/2003 | Brewer et al. |
| 6,569,958 B1 | 5/2003 | Gross et al. |
| 6,602,565 B1 | 8/2003 | Katayama et al. |
| 6,608,136 B1 | 8/2003 | Dean et al. |
| 6,619,330 B2 | 9/2003 | Ito et al. |
| 6,637,465 B2 | 10/2003 | Ito et al. |
| 6,649,704 B2 | 11/2003 | Brewer et al. |
| 6,653,437 B2 | 11/2003 | Hinokimori et al. |
| 6,657,014 B1 | 12/2003 | Mori et al. |
| 6,699,946 B1 * | 3/2004 | Lambla et al. ................ 525/537 |
| 6,713,569 B2 | 3/2004 | Chorvath et al. |
| 6,740,707 B2 | 5/2004 | Ono et al. |
| 6,740,709 B2 | 5/2004 | Ono et al. |
| 6,743,868 B2 | 6/2004 | Fournier et al. |
| 6,849,697 B2 | 2/2005 | Lambla et al. |
| 6,875,517 B2 | 4/2005 | Bosshammer et al. |
| 6,888,719 B1 | 5/2005 | Janzen et al. |
| 6,923,845 B2 | 8/2005 | Nichols et al. |
| 6,988,442 B2 | 1/2006 | Fisher |
| 7,011,114 B2 | 3/2006 | Suzuki et al. |
| 7,041,741 B2 | 5/2006 | Patel et al. |

(56) References Cited

U.S. PATENT DOCUMENTS

| | | |
|---|---|---|
| 7,059,365 B2 | 6/2006 | O'Connell |
| 7,208,207 B2 | 4/2007 | Ono et al. |
| 7,442,744 B2 | 10/2008 | Tokushige et al. |
| 7,807,245 B2 | 10/2010 | Bersted et al. |
| 7,960,473 B2 | 6/2011 | Kobayashi et al. |
| 7,981,981 B2 | 7/2011 | Ajbani et al. |
| 8,273,432 B2 | 9/2012 | Mizutani et al. |
| 2004/0058111 A1 | 3/2004 | Manas-Zloczower et al. |
| 2005/0089688 A1 | 4/2005 | Mungioli et al. |
| 2005/0208248 A1 | 9/2005 | Ilo et al. |
| 2006/0151038 A1 | 7/2006 | Gregrich |
| 2006/0229417 A1 | 10/2006 | Ferrate et al. |
| 2008/0120968 A1 | 5/2008 | Beall et al. |
| 2009/0061134 A1* | 3/2009 | Ajbani et al. ............... 428/36.4 |
| 2010/0004375 A1 | 1/2010 | Lalgudi et al. |
| 2010/0048777 A1 | 2/2010 | Kodama et al. |
| 2010/0050606 A1 | 3/2010 | Fulks et al. |
| 2011/0226375 A1 | 9/2011 | Harris et al. |
| 2011/0287201 A1 | 11/2011 | Abe et al. |
| 2012/0037397 A1 | 2/2012 | Mhetar |
| 2013/0059976 A1 | 3/2013 | Matsuo et al. |
| 2013/0273287 A1* | 10/2013 | Luo et al. ............... 428/36.91 |
| 2013/0273288 A1* | 10/2013 | Luo et al. ............... 428/36.91 |
| 2013/0273289 A1* | 10/2013 | Luo et al. ............... 428/36.91 |

FOREIGN PATENT DOCUMENTS

| | | |
|---|---|---|
| EP | 1561626 | 11/2010 |
| EP | 2418255 | 2/2012 |
| FR | 2617176 | 12/1988 |
| GB | 1558491 | 1/1980 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 2007-169550 A | 7/2007 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | WO 91/18055 | 11/1991 |
| WO | WO 94/16018 | 7/1994 |

OTHER PUBLICATIONS

Chinese Search Report dated Dec. 23, 2015, 2 pages.
Abstract of Japanese Patent—JPH06234887A, Aug. 23, 1994, 1 page.
Abstract of Japanese Patent—JP 2004300272A, Oct. 28, 2004, 1 page.
Abstract of Japanese Patent—JP 2008110561A, May 15, 2008, 1 page.
Abstract of Japanese Patent—JP 2009256608A, Nov. 5, 2009, 1 page.

* cited by examiner

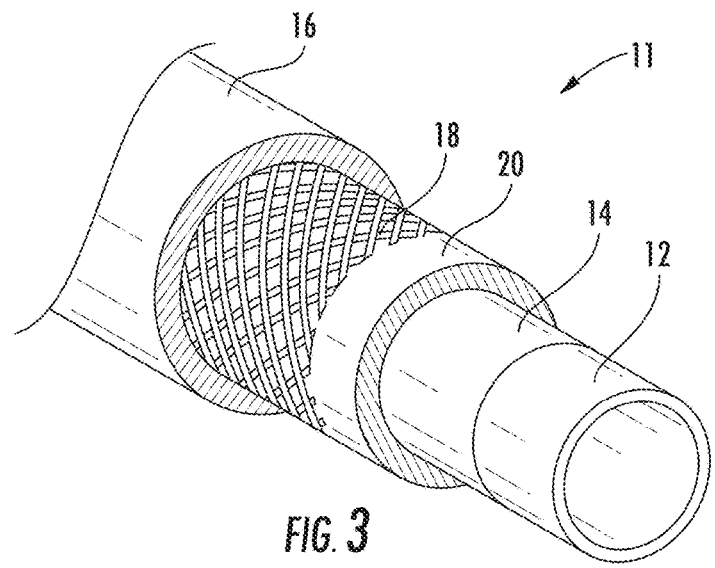
FIG. 3
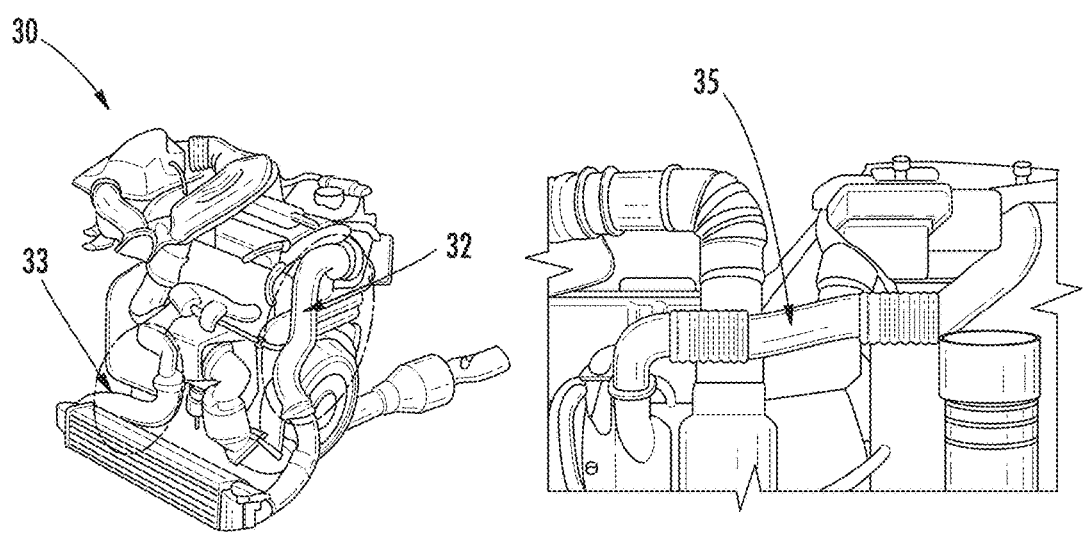
FIG. 4
FIG. 5

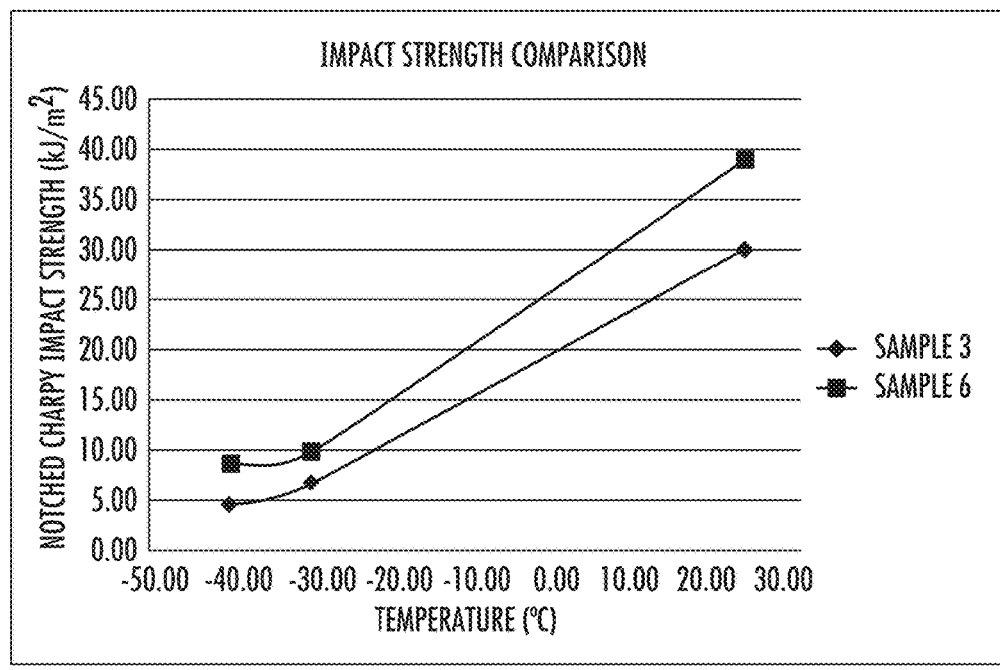
FIG. 14
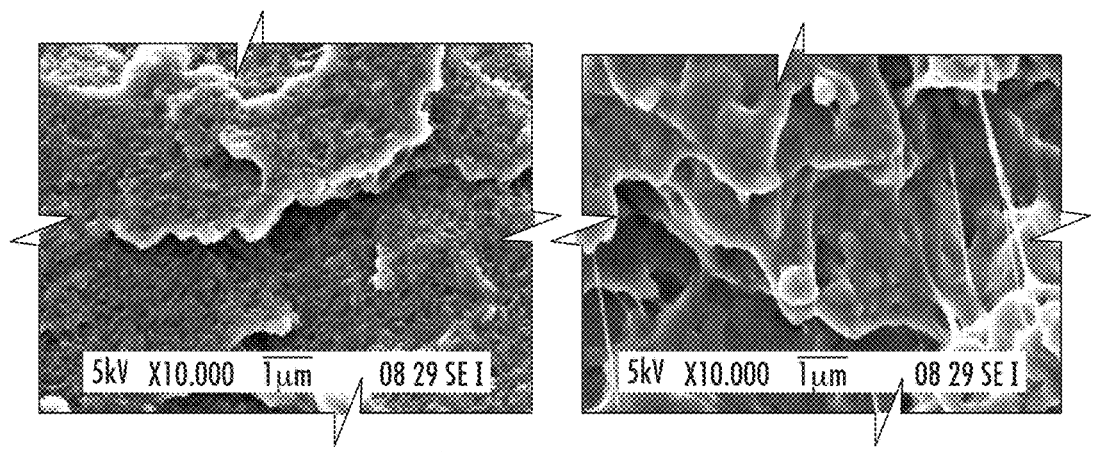
FIG. 15A (SAMPLE 3)  FIG. 15B (SAMPLE 6)

POLYARYLENE SULFIDE COMPONENTS FOR HEAVY DUTY TRUCKS

CROSS REFERENCE TO RELATED APPLICATION

The present application claims filing benefit of U.S. Provisional Patent Application Ser. No. 61/623,618 having a filing date of Apr. 13, 2012; U.S. Provisional Patent Application Ser. No. 61/665,619 having a filing date of Jun. 28, 2012; U.S. Provisional Patent Application Ser. No. 61/707,377 having a filing date of Sep. 28, 2012; and U.S. Provisional Patent Application Ser. No. 61/717,910 having a filing date of Oct. 24, 2012; all of which are incorporated herein by reference in their entirety.

BACKGROUND OF THE INVENTION

Vehicles that have been designed to carry large cargo loads face unique operating conditions due to the circumstances that can be expected during use. For instance, the engines of heavy duty trucks, which include those trucks having a gross vehicle weight range of over about 9,000 kg (about 19,800 pounds), operate at high temperatures, particularly when carrying a load. In addition, heavy duty truck components will encounter high mechanical stresses, large vibrations, and environmental assaults (e.g., dirt and rocks, extreme heat and cold, chemical assaults, etc.) on a regular basis. The day-to-day operating conditions for a heavy duty truck are more extreme in almost every respect as compared to a typical passenger vehicle and the components used to form the heavy duty truck should provide the desired strength characteristics and resistance to degradation in the face of the expected operation conditions over the life of the vehicle.

In addition, cost and revenue associated with transport of goods are influenced by the weight and durability of the transport vehicles. Exemplary costs include fuel and maintenance. Each pound weight of a vehicle increases fuel consumption and wear on a vehicle. Revenue is also affected by weight. Each pound of additional cargo that may be transported leads to increased revenue. As such, transportation companies attempt to reduce the weight of vehicles while simultaneously retaining durability of replaced parts.

To reduce the weight of the vehicle, manufacturers of transportation vehicle parts have looked to reduce the weight associated with the parts. For example, many heavy duty truck components that have been formed in the past from metals have been examined for formation from lighter weight polymers. Many components such as hoses, belts, fuel lines, cooling system components, brake components, couplings, etc. are now formed to include the maximum amount of polymeric materials. Many of these components are currently formed of various synthetic rubbers, such as silicone rubbers. Unfortunately, these materials can exhibit less than desirable resistance to high temperatures as well as physical and chemical assaults expected in the harsh conditions of use.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of a polyarylene sulfide composition.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still fail to provide product performance as desired, particularly in applications that require both high heat resistance and high impact resistance as may be encountered by heavy duty truck components.

What are needed in the art are heavy duty truck components formed of polyarylene sulfide compositions that exhibit light weight in conjunction with high strength characteristics and resistance to degradation, even in extreme operating conditions as may be expected for heavy duty trucks.

SUMMARY OF THE INVENTION

Disclosed in one embodiment is a heavy duty truck component formed of a polyarylene sulfide composition. The polyarylene sulfide composition includes a polyarylene sulfide and a crosslinked impact modifier. The heavy duty truck component exhibits high strength and good flexibility. For instance, the polyarylene sulfide composition used to form the component can exhibit a notched Charpy impact strength of greater than about 3 kJ/m$^2$ as measured according to ISO Test No. 179-1 at a temperature of 23° C. and a notched Charpy impact strength of greater than about 8 kJ/m$^2$ as measured according to ISO Test No. 179-1 at a temperature of −30° C.

Also disclosed is a method for forming a heavy duty truck component that includes shaping a polyarylene sulfide composition that includes a polyarylene sulfide and a crosslinked impact modifier. For instance, the polyarylene sulfide composition can be injection molded, blow molded, or otherwise molded to form the heavy duty truck component. In one embodiment, a method can include first forming the polyarylene sulfide composition according to a process that includes feeding a polyarylene sulfide, an impact modifier, and a cross linking agent to a melt processing unit. More specifically, the cross linking agent can be fed to the processing unit following combination of the impact modifier and the polyarylene sulfide and following distribution of the impact modifier throughout the polyarylene sulfide.

Also disclosed are heavy duty truck components that can beneficially incorporate the polyarylene sulfide composition including, without limitation, tubular members. Tubular members can encompass pipes and hoses suitable for carrying water, oil, diesel, air, exhaust, urea, etc. Heavy duty trucks incorporating the components are also disclosed herein.

BRIEF DESCRIPTION OF THE FIGURES

The present disclosure may be better understood with reference to the following figures:

FIG. 3 is another multi-layer tubular member, one or more layers of which may be formed from the polyarylene sulfide composition.

FIG. 4 illustrates an engine including tubular members as may be formed from the polyarylene sulfide composition.

FIG. 5 illustrates a charge air system coupling as may be formed of the polyarylene sulfide composition.

FIG. 14 illustrates the effect of temperature change on the notched Charpy impact strength of a polyarylene sulfide composition as described herein and that of a comparison composition.

FIG. 15 is a scanning electron microscope image of a polyarylene sulfide composition as described herein (FIG. 15B) and a comparison polyarylene sulfide (FIG. 15A).

DETAILED DESCRIPTION

Figure 1:
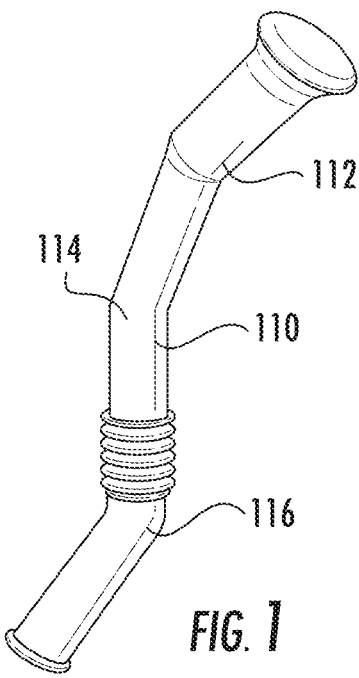
FIG. 1 is a single layer tubular member as may be formed from the polyarylene sulfide composition.

It is to be understood by one of ordinary skill in the art that the present discussion is a description of exemplary embodiments only, and is not intended as limiting the broader aspects of the present disclosure.

The present disclosure is generally directed to heavy duty truck components formed of polyarylene sulfide compositions that exhibit excellent toughness and flexibility characteristics as well as resistance to chemical degradation due to contact with, e.g., water, oil, gas, synthetic or natural chemicals, etc. Beneficially, the polyarylene sulfide composition can maintain good physical characteristics even when utilized in extreme temperature applications such as may be encountered during the lifetime of the heavy duty truck component. The polyarylene sulfide can also maintain good physical characteristics under conditions in which the materials are subjected to extreme temperature fluctuations.

The polyarylene sulfide composition used to form the heavy duty truck components can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent to the polyarylene sulfide composition following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processibility that can be utilized to form a heavy duty truck component that can exhibit excellent resistance to degradation under a variety of conditions.

The high strength and flexibility characteristics of the polyarylene sulfide composition can be evident by examination of the tensile, flexural, and/or impact properties of the materials. For example, the polyarylene sulfide composition can have a notched Charpy impact strength of greater than about 3 kJ/m$^2$, greater than about 3.5 kJ/m$^2$, greater than about 5 kJ/m$^2$, greater than about 10 kJ/m$^2$, greater than about 15 kJ/m$^2$, greater than about 30 kJ/m$^2$, greater than about 33 kJ/m$^2$, greater than about 40 kJ/m$^2$, greater than about 45 kJ/m$^2$, or greater than about 50 kJ/m$^2$ as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the polyarylene sulfide composition can maintain good physical characteristics even at extreme temperatures, including both high and low temperatures. For instance, the polyarylene sulfide composition can have a notched Charpy impact strength of greater than about 8 kJ/m$^2$, greater than about 9 kJ/m$^2$, greater than about 10 kJ/m$^2$, greater than about 14 kJ/m$^2$, greater than about 15 kJ/m$^2$, greater than about 18 kJ/m$^2$, or greater than about 20 kJ/m$^2$ as determined according to ISO Test No. 179-1 at −30° C.; and can have a notched Charpy impact strength of greater than about 8 kJ/m$^2$, greater than about 9 kJ/m$^2$, greater than about 10 kJ/m$^2$, greater than about 11 kJ/m$^2$, greater than about 12 kJ/m$^2$, or greater than about 15 kJ/m$^2$ as determined according to ISO Test No. 179-1 at −40° C.

Moreover, the effect of temperature change on the polyarylene sulfide composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the polyarylene sulfide composition also increases, as expected, but the rate of increase of the impact strength is very high, particularly as compared to a composition that does not include the dynamically crosslinked impact modifier. Accordingly, the polyarylene sulfide composition can exhibit excellent strength characteristics at a wide range of temperatures.

The polyarylene sulfide composition can exhibit very good tensile characteristics. For example, the polyarylene sulfide composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The polyarylene sulfide composition may have a tensile strength at break of greater than about 30 MPa, greater than about 35 MPa, greater than about 40 MPa, greater than about 45 MPa, or greater than about 70 MPa.

In addition, the polyarylene sulfide composition can have a relatively low tensile modulus. For instance, the polyarylene sulfide composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The polyarylene sulfide composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The polyarylene sulfide composition can also be utilized continuously at high temperature, for instance heavy duty truck components formed of the polyarylene sulfide composition may be utilized at a continuous use temperature of up to about 150° C., about 160° C., or about 165° C. without loss of tensile strength. For example, the polyarylene sulfide composition can maintain greater than about 95%, for instance about 100% of the original tensile strength after 1000 hours of heat aging at 165° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The polyarylene sulfide composition may have a flexural strength at break of greater than about 30 MPa, greater than about 35 MPa, greater than about 40 MPa, greater than about 45 MPa, or greater than about 70 MPa.

The deflection temperature under load of the polyarylene sulfide composition can be relatively high. For example, the deflection temperature under load of the polyarylene sulfide composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The polyarylene sulfide composition can also exhibit excellent stability during long term exposure to harsh environmental conditions. For instance, under long term exposure to an acidic environment, the polyarylene sulfide composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the polyarylene sulfide composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the polyarylene sulfide composition can maintain about 80% or more of the initial Charpy notched impact strength. The polyarylene sulfide composition can also maintain desirable strength characteristics following exposure to other potentially degrading materials, such as salts, e.g., road salts as may be encountered by heavy trucks.

Permeation resistance can be important for a wide variety of applications for the polyarylene sulfide composition, for instance when utilizing the composition in formation of heavy duty truck components such as fuel lines, storage tanks, or the like. The polyarylene sulfide composition can exhibit excellent permeation resistance to a wide variety of materials. For instance, a shaped product formed of the polyarylene sulfide composition can exhibit a permeation resistance to a fuel or a fuel source (e.g., gasoline, diesel fuel, jet fuel, unrefined or refined oil, etc.) of less than about 3 g-mm/m$^2$-day, less than about 2 g-mm/m$^2$-day, less than about 1 g-mm/m$^2$-day, or less than about 0.5 g-mm/m$^2$-day. By way of example, the polyarylene sulfide composition (or a product formed of the polyarylene sulfide composition) can exhibit a permeation resistance to an ethanol blend of ethanol/iso-octane/toluene at a weight ratio of 10:45:45 at 40° C. of less than about 3 g-mm/m$^2$-day, less than about 2.5 g-mm/m$^2$-day, less than about 1 g-mm/m$^2$-day, or less than about 0.1 g-mm/m$^2$-day. The permeation resistance to a blend of 15 wt. % methanol and 85 wt. % oxygenated fuel (CM15A) at 40° C. can be less than about 3 g-mm/m$^2$-day, less than about 2.5 g-mm/m$^2$-day, less than about 1 g-mm/m$^2$-day, less than about 0.5 g-mm/m$^2$-day, less than about 0.3 g-mm/m$^2$-day, or less than about 0.15 g-mm/m$^2$-day. The permeation resistance to methanol at 40° C. can be less than about 1 g-mm/m$^2$-day, less than about 0.5 g-mm/m$^2$-day, less than about 0.25 g-mm/m$^2$-day, less than about 0.1 g-mm/m$^2$-day, or less than about 0.06 g-mm/m$^2$-day. Permeation resistance can be determined according to SAE Testing Method No. J2665. In addition, the polyarylene sulfide composition can maintain original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The polyarylene sulfide composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The polyarylene sulfide composition can also exhibit good processing characteristics, for instance as demonstrated by the melt viscosity of the composition. For instance, the polyarylene sulfide composition can have a melt viscosity of less than about 2800 poise as measured on a capillary rheometer at 316° C. and 400 sec$^{-1}$ with the viscosity measurement taken after five minutes of constant shear. Moreover, the polyarylene sulfide composition can exhibit improved melt stability over time as compared to polyarylene sulfide compositions that do not include crosslinked impact modifiers, i.e., while polyarylene sulfide compositions that do not include a crosslinked impact modifier tend to exhibit an increase in melt viscosity over time, disclosed compositions can maintain or even decrease in melt viscosity over time.

The polyarylene sulfide composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the polyarylene sulfide composition. In addition, the polyarylene sulfide composition can exhibit high shear sensitivity, which indicates excellent characteristics for use in formation processes such as blow molding and extrusion processing.

The polyarylene sulfide composition may be utilized in forming all manner of components as may be incorporated in a heavy duty truck. In one embodiment, the polyarylene sulfide composition may be utilized in forming tubular members that may be subject to extreme temperatures as well as large temperature fluctuations during use. For instance, tubular members may be used in cooling air systems, diesel lines, air brake lines, urea tanks, exhaust systems, and the like. Components as may be formed from the polyarylene sulfide composition are not limited to tubular members, however, and other components such as flanges, valves, valve seats, seals, sensor housings, thermostats, thermostat housings, diverters, linings, propellers, and so forth, may be formed of the polyarylene sulfide composition.

The tubular members formed from the polyarylene sulfide composition may be single-layered or multi-layered. In operation, a tubular member may be a component of, e.g., a hose assembly or a fuel line assembly or a fluid transfer system. A fluid transfer system generally includes a tubular member such as a hose and at one or more ends of the hose, one or more clamps, couplings, connectors, tubing, nozzles, and/or fittings, fluid handling devices, and the like.

A component can include the polyarylene sulfide composition throughout the entire component or only a portion of the component. For instance, when considering a component having a large aspect ratio (L/D>1), such as a tubular member, the component can be formed such that the polyarylene sulfide composition extends along a section of the component and an adjacent section can be formed of a different composition, for instance a different polyarylene sulfide composition. Such a component can be formed by, e.g., altering the material that is fed to a molding device during a formation process. The component can include an area in which the two materials are mixed that represents a border region between a first section and a second section formed of different materials. A component can include a single section formed of the polyarylene sulfide composition or a plurality of sections, as desired. Moreover, other sections of a component can be formed of multiple different materials. By way of example, when considering a tubular component such as a fluid conduit, both ends of the tubular component can be formed of the polyarylene sulfide composition and a center section can be formed of a less flexible composition. Thus, the more flexible ends can be utilized to tightly affix the component to other components of a system.

Alternatively, a center section of a component could be formed from the polyarylene sulfide composition, which can improve flexibility of the component in that section, making installation of the component easier.

Referring to FIG. 1, one embodiment of a tubular member 110 formed from the polyarylene sulfide composition is shown. As shown, the tubular member 110 extends in multiple directions leading to a relatively complex shape. For instance, during formation and before the polyarylene sulfide composition can solidify, the angular displacements as shown in FIG. 1 can be formed into the part. The tubular member 110 includes angular displacement changes at 112, 114 and 116. The tubular member 110 may comprise, for instance, a part that may be used in the exhaust system of a heavy duty truck.

Figure 2:
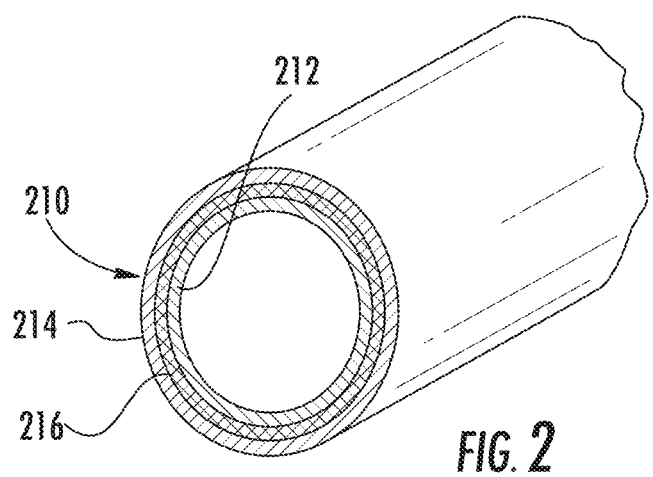
FIG. 2 is a multi-layer tubular member, one or more layers of which may be formed from the polyarylene sulfide composition.

A tubular member that incorporates the polyarylene sulfide composition can be a multi-layered tubular member. FIG. 2 illustrates a multi-layered tubular member 210 as may incorporate the polyarylene sulfide composition in one or more layers of the tubular member. For example, the inner layer 212 can include the polyarylene sulfide composition. The outer layer 214 and the intermediate layer 216 can include a polyarylene sulfide composition that is the same or different than the polyarylene sulfide composition utilized to form the inner layer. Alternatively, layers of the multilayer tubular member may be formed of different materials. For example, in one embodiment the intermediate layer 216 can be formed of polyamides from the group of homopolyamides, co-polyamides, their blends or mixtures which each other or with other polymers. Alternatively, layer 216 can be formed of a fiber reinforced material such as a fiber-reinforced resin composite or the like. For example, a polyaramid (e.g., Kevlar®) woven mat can be utilized to form an intermediate layer 216 that is highly resistant to mechanical assaults.

Outer layer 214 can provide protection from external assaults as well as provide insulative or other desirable characteristics to the tubular member. For example, a multi-layer hose can include an outer layer 214 formed from an adequate kind of rubber material. Examples of such materials include thermoplastic elastomer such as polyamide thermoplastic elastomer, polyester thermoplastic elastomer, polyolefin thermoplastic elastomer, and styrene thermoplastic elastomer. Other possible materials for outer layer 214 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 214 can alternatively be formed of a harder, less flexible material, such as a polyolefin, polyvinylchloride, or a high density polyethylene, a fiber reinforced composite material such as a glass fiber composite or a carbon fiber composite, or a metal material such as a steel jacket.

Of course, a multi-layer tubular member is not limited to three layers, and may include two, four, or more distinct layers. A multi-layer tubular member may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

Referring to FIG. 3, a multi-layer tubular member including five layers is illustrated. Tubular member 11 includes an inner tube 12, intermediate barrier layer 14, and outer cover 16. Tubular member 11 also includes a reinforcement layer 18 positioned between a tie layer 20 and the outer cover 16, though the reinforcement layer may optionally be located between different layers of the tubular member 11. For example, the reinforcement layer may be located between the inner tube 12 and the intermediate barrier layer 14. Tubular member 11 may also include one or more tie layers and/or adhesive coatings between various layers.

In general, the inner tube 12 may include the polyarylene sulfide composition. Thus, the inner surface material of the tube may be chosen to withstand the fluids and environmental conditions expected within the hose. The barrier layer 14 may be formed of a material that can exhibit low permeability to materials to be carried by the tubular member, e.g., diesel fuel. For example, the barrier layer may be formed of a polyamide such as PA6, PA11, PA12, PA66, PA 610, PA46, etc., as well as blends of polymers.

In general, tie layer 20 may be used to facilitate bonding between the barrier layer 14 and other layers such as the reinforcement layer 18 of FIG. 3. A tie layer may include a rubber composition based on, e.g., epichlorohydrin rubber, nitrile rubber, butadiene rubber/poly(vinyl chloride) blends, hydrogenated nitrile rubber, thermoplastic elastomers, or the like. The tie layer could be an adhesive coating.

In general, cover 16 may be made of one or more suitable flexible elastomeric or plastic materials designed to withstand the exterior environment encountered. For instance, the cover 16 may be formed of a polyarylene sulfide composition that is the same or different as the polyarylene sulfide composition utilized in forming the inner tube 12. According to another embodiment, the outer cover 16 can be based on a rubber formulation such as, without limitation, hydrogenated nitrile rubber, chlorosulfonated polyethylene, polychloroprene, epichlorohydrin rubber, ethylene/vinylacetate copolymers, polyacrylic rubber, ethylene alkene copolymer, butadiene rubber/poly(vinyl chloride) blends, chlorinated polyethylene, and the like, which may be formulated with other ingredients in accordance with known methods of rubber compounding.

A reinforcement layer 18 may be present in the tubular member 11. The reinforcement may be applied directly onto intermediate layer 14 and thereby at least a portion of the reinforcement layer 18 may be in contact with the intermediate layer 14. For instance, a spiraled, knitted or braided layer of textile or wire can be utilized as a reinforcement layer 18. In a spiral construction, for example, the spiraled layer may comprise two layers, each applied at or near the so-called lock angle or neutral angle of about 54° with respect to the longitudinal axis of the tubular member 11 but with opposite spiral directions. However, the tubular member 11 is not limited to spiral constructions. A textile or wire reinforcement layer 18 may be knit, braided, wrapped, woven, or non-woven fabric.

A tubular member including the polyarylene sulfide composition can exhibit excellent flexibility and heat resistance, which can be of benefit if forming a tubular member for the charge air system of a heavy duty truck. For example, FIG. 4 illustrates an engine block 30 that can include tubular members 32, 33 that can be formed of the polyarylene sulfide composition and utilized in the air handling system. A heat resistant tubular member for use in the air handling system can include an inner layer that includes the polyarylene sulfide composition and an outer layer formed on an outer peripheral surface of the tubular inner layer that can include a flame retardant. For example, the outer layer can be formed by using a material containing non-halogen flame retardant.

FIG. 5 illustrates a charge air system coupling 35 as may be formed from the polyarylene sulfide composition. A charge air system coupling 35 can provide a connection between various charge components of the charge air system including, without limitation, at the compressor inlet and discharge, at the charge air cooler, and/or at the turbine inlet and discharge. The flexibility and strength of the polyarylene sulfide composition can provide for a charge air system coupling that can handle slight misalignments between components of the system as well as isolate vibration between ends of the coupling. In addition, the resistance characteristics of the polyarylene sulfide composition can improve the coupling with regard to ozone resistance and increase the life of the component.

Figure 6:
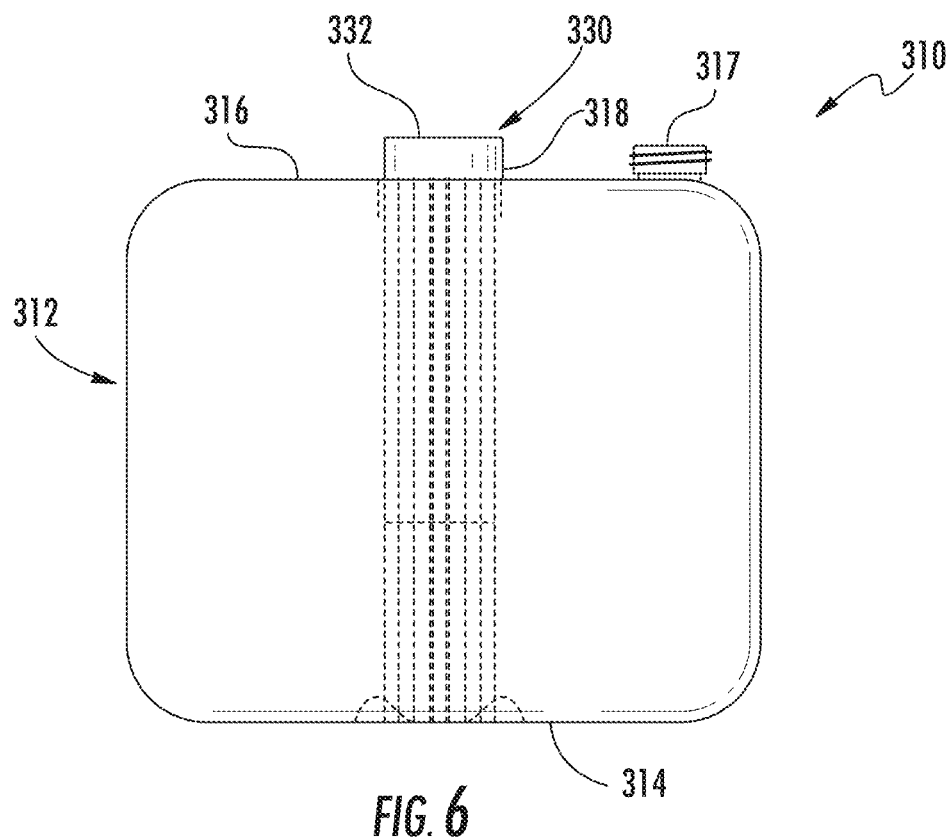
FIG. 6 illustrates a urea tank for a heavy duty truck as may incorporate components including the polyarylene sulfide composition.

The polyarylene sulfide composition can be beneficially utilized in urea tanks of heavy duty trucks. For example, the urea tank 310 schematically depicted in FIG. 6 includes a container 312 with a bottom wall 314 and a top wall 316. In the top wall 316 there is an opening 318 for the accommodation of a set of fittings 330. The container 312 further comprises a filling opening 317.

Figure 7:
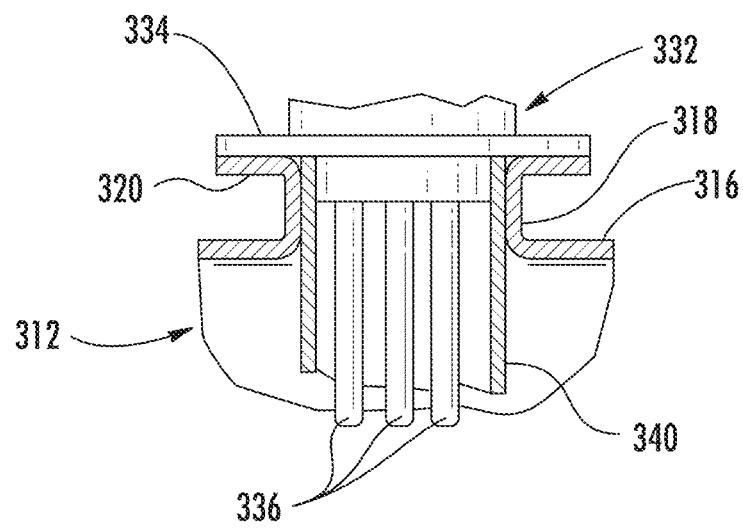
FIG. 7 illustrates a fitting of the urea tank of FIG. 6.

The set of fittings 330 comprises a head 332 arranged to be connected fluid-tightly to the opening 318 in the top wall 316. This may be achieved in many different ways, e.g. by a flange connection between a radial flange 320 (FIG. 7) of the opening 318 and a radial flange 334 of the head 332. The head 332 may also take the form of a screw cap with internal or external threads adapted to engaging with complementary threads (not depicted) of the opening 318. A multiplicity of fittings 336 extend from the head 332 into the container 312. The fittings 336 may include a suction pipe for urea/water solution, a return pipe for unconsumed solution, a heating coil for thawing the solution when the latter is frozen by low ambient temperature, and a level sensor for the solution in the container. Beneficially, one or more of the suction pipe, the return pipe and the heating coil and/or a protective cover 340 may be formed of the polyarylene sulfide composition.

The excellent strength characteristics of the polyarylene sulfide composition can protect the components of the fittings 336 from harmful mechanical effects due to icing in the container 312, and the fittings 336 can sustain affect from movements of ice in the container 312.

Figure 8:
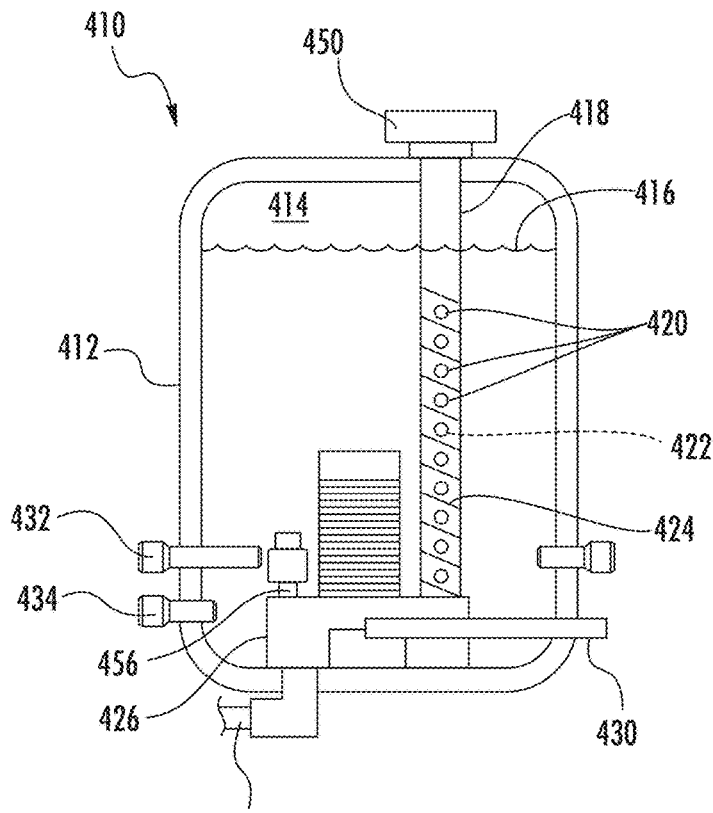
FIG. 8 illustrates another embodiment of a urea tank for a heavy duty truck as may incorporate components including the polyarylene sulfide composition.

Another exemplary urea tank assembly 410 is shown in FIG. 8. The urea tank assembly includes a reservoir 412 having a cavity 414 configured for receiving and holding a liquid, such as urea solution 416. The assembly further includes a tubular member 418 that can be formed of the polyarylene sulfide composition having one or more, or plurality of, openings 420 formed therethrough for providing fluid communication between a hollow portion 422 of the hollow member and the cavity of the reservoir. The assembly further includes a heater 424 located proximate to or formed by the hollow portion to heat the urea solution within and about the hollow member. The assembly also includes a pump 426 for causing fluid from within the cavity 414, and in some exemplary embodiments from within the hollow portion, to be pumped to an exhaust gas stream for dispensing therein.

In operation, the urea solution 416 is pumped, injected or otherwise placed into the cavity 414 through suitable urea input conduit 428 or through other means such as a capped opening 450. The urea solution is heated through heater 424 and pumped through a urea outlet conduit 430 through pump 426. Optionally, pumping of the urea solution may be achieved through a fluid level switch 432, 456 and heating may be based upon temperature reading from a temperature sensor 434. The urea solution travels along the urea outlet conduit to a port in fluid communication with an exhaust gas conduit from an engine. The port provides means, such as an injector, for delivery into an exhaust gas stream and more particularly upstream from an exhaust gas treatment device.

Figure 9:
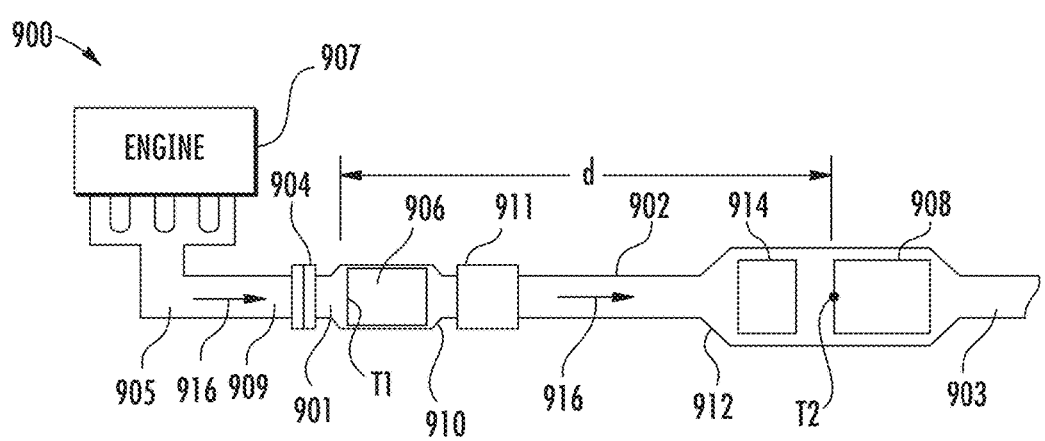
FIG. 9 illustrates a heavy duty truck exhaust system as may incorporate components formed of the polyarylene sulfide composition.

The polyarylene sulfide composition may also be beneficially utilized in forming components of an exhaust system such as the diesel exhaust system 900 illustrated in FIG. 9 for venting exhaust from an exhaust manifold 905 of a diesel engine 907 as depicted by directional arrow 916. The exhaust system 900, as shown, includes an exhaust line 902 with inlet end 901 and outlet end 903. All or a portion of the exhaust line 902 can be formed of the polyarylene sulfide composition. The inlet end 901 is coupled to the diesel engine 907 through an exhaust manifold 905. The inlet end 901 may include a connection device 904, which may take on any suitable form. For example, the connection device 904 may be a flange that can be coupled to a similar flange on a connection portion 909 of the exhaust manifold 905. Although the exhaust line 902 is shown as being generally straight, in practice it may take on other profiles and may include straight and curved sections and/or sections of differing diameter.

The exhaust system 900 includes a first particulate filter 906 disposed adjacent to the inlet end 901 of the exhaust line 902 so as to be in a "close-coupled" position with respect to the engine 907 and, of course, also the exhaust manifold 905. A turbocharger 911 is positioned in the exhaust line 902 and the first particulate filter 906 upstream of the turbocharger 911 such that the hot gases directly impinge upon the first filter 906. The exhaust system 900 of FIG. 9 further includes a second particulate filter 908 positioned in the exhaust line 902. The exhaust system 900 may further include devices such as diffusion and expansion cones 910, 912 at the inlet and outlet ends of the particulate filters 906, 908 to aid in achieving desired exhaust flow distribution in the particulate filters, and/or size and weight reductions in the exhaust line 902.

Figure 10:
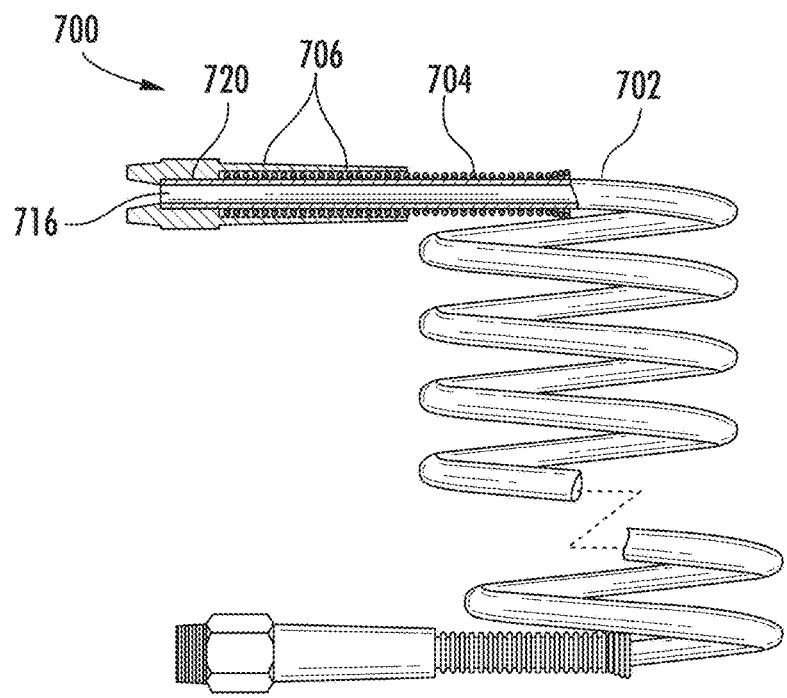
FIG. 10 illustrates a coiled air brake hose assembly as may incorporate the polyarylene sulfide composition.

The air brake system of a heavy duty truck may also include components formed of the polyarylene sulfide composition. FIG. 10 illustrates an exemplary embodiment of a coiled air brake hose assembly 700. The coiled air brake hose assembly 700 includes a coiled hose 702 having a plurality of coils and a straight terminal end 720. The hose 702 may be a single layer hose or a multi-layer hose as described above in which at least one layer includes the polyarylene sulfide composition.

The coiled air brake hose assembly 700 also includes a fitting 706 molded over the end of hose 702. In addition, the coiled air brake hose may include a strain relief component 704, embodied in FIG. 10 as a spring. In the exemplary embodiment illustrated, the hose 702 defines a lumen 716 that is accessible via the fitting 706. The overmolded fitting 706 is a single monolithic component and is formed to bond to and conform to the shape of the hose 702 and, optionally, the strain relief component 704.

Figure 11:
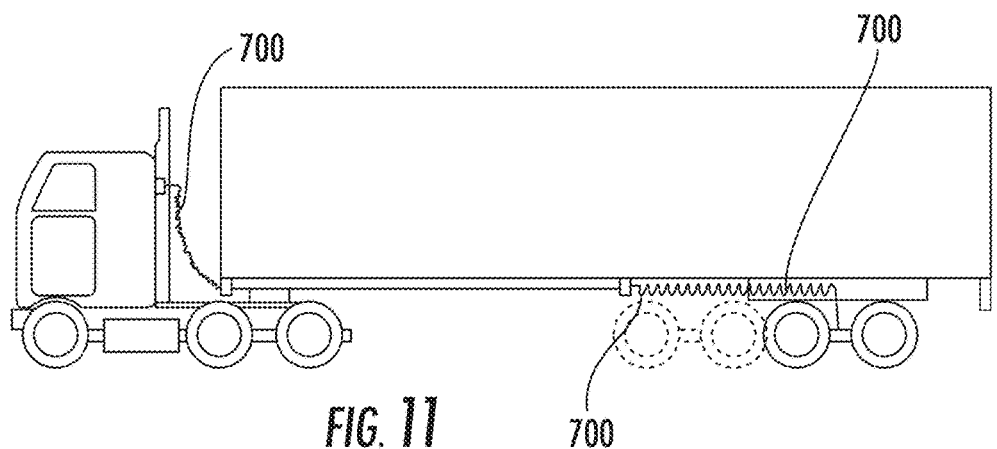
FIG. 11 illustrates an exemplary heavy duty truck incorporating the air brake hose assembly of FIG. 10.

FIG. 11 illustrates an exemplary heavy duty truck including a tractor truck and trailer. The coiled air brake hose assembly 700 may be used to couple air brake systems between vehicles or within a vehicle, as shown. Utilization of the polyarylene sulfide composition in forming the air brake hose assembly can be particularly advantageous. For example, the coiled air brake hose assembly can exhibit considerable leak resistance and protection from external exposure to corrosive chemicals, such as zinc chloride, calcium chloride, copper chloride, and magnesium chloride. In addition, the assembly can exhibit considerable tensile strength when exposed to longitudinal forces due to the excellent physical characteristics of the polyarylene sulfide composition.

Of course, heavy duty trucks as may include one or more components formed from a polyarylene sulfide composition are not limited to those as illustrated in FIG. 11. Any heavy duty truck having a gross vehicle weight range over about 9,000 kg is encompassed herein. Such trucks can include trucks have two, three, four, or more axles and can include both tractors and trailers that may be pulled by tractors. By way of example, contractor's trucks, delivery trucks, dump trucks, panel trucks, mix-in-transit trucks, truck tractors, and so forth are encompassed herein.

Figure 12:
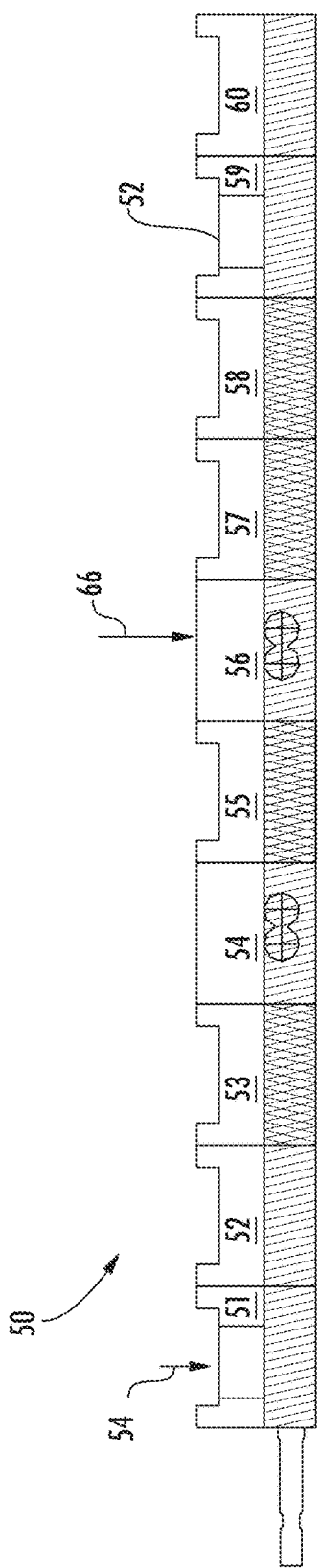
FIG. 12 is a schematic representation of a process for forming the polyarylene sulfide composition as disclosed herein.

According to one embodiment, a method for forming the heavy duty truck components can include formation of the polyarylene sulfide composition. FIG. 12 illustrates a schematic of a process that can be used in forming the polyarylene sulfide composition. As illustrated, the components of the polyarylene sulfide composition may be melt-kneaded in a melt processing unit such as an extruder 50. Extruder 50 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 50 that includes multiple zones or barrels. In the illustrated embodiment, extruder 50 includes 10 barrels numbered 51-60 along the length of the extruder 50, as shown. Each barrel 51-60 can include feed lines 54, 66, vents 52, temperature controls, etc. that can be independently operated. A general purpose screw design can be used to melt process the polyarylene composition. By way of example, a polyarylene sulfide composition may be melt mixed using a twin screw extruder such as a Coperion co-rotating fully intermeshing twin screw extruder.

In forming a polyarylene sulfide composition, the polyarylene sulfide can be fed to the extruder 50 at a main feed throat 54. For instance, the polyarylene sulfide may be fed to the main feed throat 54 at the first barrel 51 by means of a metering feeder. The polyarylene sulfide can be melted and mixed with the other components of the composition as it progresses through the extruder 50. The impact modifier can be added to the composition in conjunction with the polyarylene sulfide composition at the main feed throat 54 or downstream of the main feed throat, as desired.

At a point downstream of the main feed throat 54, and following addition of the impact modifier to the composition, the crosslinking agent can be added to the composition. For instance, in the illustrated embodiment, a second feed line 56 at barrel 56 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

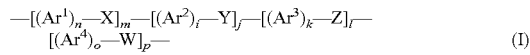

(I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, I, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —($C_6H_4$—S)$_n$— (wherein n is an integer of 1 or more) as a component thereof.

The polyarylene sulfide may be synthesized prior to forming the polyarylene sulfide composition, though this is not a requirement of a process, and a polyarylene sulfide can be purchased from known suppliers. For instance Fortron® polyphenylene sulfide available from Ticona of Florence, Ky., USA can be purchased and utilized as the polyarylene sulfide.

When employed, synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

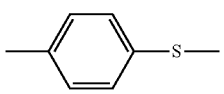

(II)

and segments having the structure of formula (III):

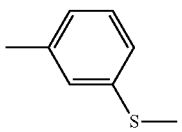

(III)

or segments having the structure of formula (IV):

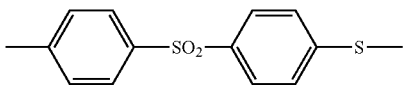

(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The polyarylene sulfide composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the polyarylene sulfide composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of $1200 \text{ s}^{-1}$ and at a temperature of 310° C.

According to one embodiment, the polyarylene sulfide can be functionalized to further encourage bond formation between the polyarylene sulfide and the impact modifier. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the polyarylene sulfide composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A polyarylene sulfide composition that exhibits excellent strength and degradation resistance in addition to low halogen content can be advantageous as low halogen content polymeric materials are becoming increasingly desired due to environmental concerns. In one embodiment, the polyarylene sulfide composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms;

a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt(ionomer)terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

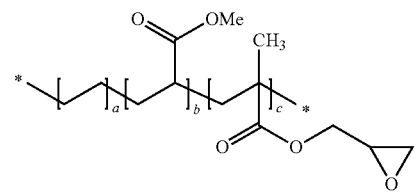

wherein, a, b, and c are 1 or greater.

In another embodiment the impact modifier can be a random copolymer of ethylene, ethyl acrylate and maleic anhydride having the following structure:

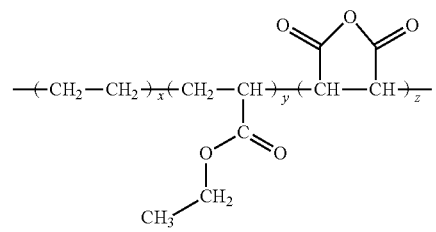

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a compolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 12, the impact modifier can be added to the composition in conjunction with the polyarylene sulfide composition at the main feed throat 54 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the polyarylene composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes. (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The polyarylene sulfide composition may generally include the crosslinking agent in an amount from about 0.05 wt. % to about 2 wt. % by weight of the polyarylene sulfide composition, from about 0.07 wt. % to about 1.5 wt. % by weight of the polyarylene sulfide composition, or from about 0.1 wt. % to about 1.3 wt. %.

The crosslinking agent can be added to the melt processing unit following mixing of the polyarylene sulfide and the impact modifier. For instance, as illustrated in FIG. 12, the crosslinking agent can be added to the composition at a downstream location 66 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the L/$L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the polyarylene sulfide composition. One or more fillers may generally be included in the polyarylene sulfide composition an amount of from about 5 wt. % to about 70 wt. %, or from about 20 wt. % to about 65 wt. % by weight of the polyarylene sulfide composition.

The filler can be added to the polyarylene sulfide composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the polyarylene sulfide composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the polyarylene sulfide composition. In general, particulate fillers can encompass any particulate material having a median particle size of less than about 750 µm, for instance less than about 500 µm, or less than about 100 µm. In one embodiment, a particulate filler can have a median particle size in the range of from about 3 µm to about 20 µm. In addition, a particulate filler can be solid or hollow, as is known. Particulate fillers can also include a surface treatment, as is known in the art.

Particulate fillers can encompass one or more mineral fillers. For instance, the polyarylene sulfide composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

A filler can be an electrically conductive filler such as, without limitation, carbon black, graphite, graphene, carbon fiber, carbon nanotubes, a metal powder, and so forth. In those embodiments in which the polyarylene sulfide composition includes electrically conductive fillers, for instance when the polyarylene sulfide composition is utilized in forming a fuel line, adequate electrically conductive filler can be included such that the composition has a volume specific resistance of equal to or less than about $10^9$ ohms cm.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the polyarylene sulfide composition can include a UV stabilizer as an additive. For instance, the polyarylene sulfide composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a polyarylene sulfide composition is one or more colorants as are generally known in the art. For instance, the polyarylene sulfide composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes Pigments that can be incorporated in a polyarylene sulfide composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the polyarylene sulfide composition can encompass, without limitation, antimicrobials, lubricants, impact modifiers, antioxidants, other stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the polyarylene sulfide composition in conventional amounts and according to conventional processing techniques, for instance through addition to the polyarylene sulfide composition at the main feed throat. For instance, colorants can be included so as to provide a heavy duty truck component, e.g., an air brake line that is of the proper color according to current regulations. Beneficially, the polyarylene sulfide composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the polyarylene sulfide composition, the composition is thoroughly mixed in the remaining section(s) of the extruder and extruded through a die. The final extrudate can be pelletized or otherwise shaped as desired, for instance the final extrudate can be in the form of a pultruded tape or ribbon that can be wrapped to form a layer of a tubular member.

Conventional shaping processes can be used for forming heavy duty truck components of the polyarylene sulfide composition including, without limitation, extrusion, injection molding, blow-molding, thermoforming, foaming, compression molding, hot-stamping, fiber spinning and so forth. Shaped articles that may be formed may include structural and non-structural shaped parts. For instance thermoform sheets, foamed substrates, injection molded or blow molded components, and the like can be formed from the polyarylene sulfide composition.

By way of example, a single layer tubular member 110 as illustrated in FIG. 1 can formed according to a blow molding process. During blow molding, the polyarylene sulfide composition is first heated and extruded into a parison using a die attached to an extrusion device. When the parison is formed, the composition must have sufficient melt strength to prevent gravity from undesirably elongating portions of the parison and thereby forming non-uniform wall thicknesses and other imperfections. The parison is received into a molding device, generally formed of multiple sections that together form a three-dimensional mold cavity.

As can be appreciated, a certain period of time elapses from formation of the parison to moving the parison into engagement with the molding device. During this stage of the process, the melt strength of the polyarylene sulfide composition can be high enough such that the parison maintains its shape during movement. The polyarylene sulfide composition can also be capable of remaining in a semi-fluid state and not solidifying too rapidly before blow molding commences.

Once the molding device is closed, a gas, such as an inert gas is fed into the parison from a gas supply. The gas supplies sufficient pressure against the interior surface of the parison such that the parison conforms to the shape of the mold cavity. After blow molding, the finished shaped article is then removed. In one embodiment, cool air can be injected into the molded part for solidifying the polyarylene sulfide composition prior to removal from the molding device.

Of course, any known tube-forming methods including blow molding in combination with other methods as well as alternative methods such as extrusion are employable. For instance, one or more layers of a multi-layered tubular member as illustrated in FIGS. 2 and 3 can be formed from a continuous tape, e.g., a fiber reinforced tape or ribbon formed according to a pultrusion formation method. A tape can be wrapped to form the tubular member or a layer of a multilayered tubular member according to known practices as are generally known in the art.

Multilayer tubular members may be made by use of one or more other conventional processes, such as, for example, co-extrusion, dry lamination, sandwich lamination, coextrusion coating, and the like. By way of example, in forming a three-layered tubular member 210 as illustrated in FIG. 2, the polyarylene sulfide composition, a polyamide composition, and a thermoplastic elastomer composition can be separately fed into three different extruders. The separate extrusion melts from those three extruders can then be introduced into one die under pressure. While producing three different tubular melt flows, those melt flows can be combined in the die in such a manner that the melt flow of the polyarylene sulfide composition forms the inner layer 212, that of the polyamide composition forms the intermediate layer 216, and that of the thermoplastic elastomer composition forms the outer layer 214, and the thus-combined melt flows are co-extruded out of the die to produce a three-layered tubular member.

A heavy duty truck component including, without limitation, a pipe or a tube can be formed according to an extrusion process. For example, a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals, and the like.

When forming a heavy duty truck component according to an extrusion process, the polyarylene sulfide composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens, and so forth. In general, the line speed can be from about 4 meters per minute to about 15 meters per minute. Of course, the actual line speed can depend upon the final dimension of the tubular member, the aesthetics of the final product and process stability.

The die swell during an extrusion process can generally be negligible. A draw down of about 1.2 to about 1.7 can generally be utilized, as a higher draw down can negatively affect the final properties of the tubular member, depending on other processing conditions. Die drool can generally be avoided by drying the resin adequately prior to extrusion as well as by maintaining the melt temperature at less than about 304° C.

In one embodiment, tubular members extruded from the polyarylene sulfide composition can have a wall thickness of between about 0.5 millimeters to about 5 millimeters, though tubular members having larger wall thickness can be formed from the composition as desired. The calibration ring inner diameter can decide the outer diameter of the tubular member and will generally be less than the outer diameter of the die, as is known. The inner diameter of the tubular member can be utilized to determine the desired outer diameter of the mandrel and the line speed, as is known.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

FORMATION AND TEST METHODS

Injection Molding Process: Tensile bars are injection molded to ISO 527-1 specifications according to standard ISO conditions.

Melt Viscosity: All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Unnotched Charpy Impact Strength: Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength: Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity: Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat softening temperature: Vicat Softening temperature was determined according to method A, with a load of 10 N and according to method B with a load of 50 N as described in ISO Test No. 306 (technically equivalent to ASTM D1525), both of which utilized a heating rate of 50 K/h.

Water absorption was determined according to ISO Test No. 62. The test specimens are immersed in distilled water at 23° C. until the water absorption essentially ceases (23° C./sat).

Complex viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 13:
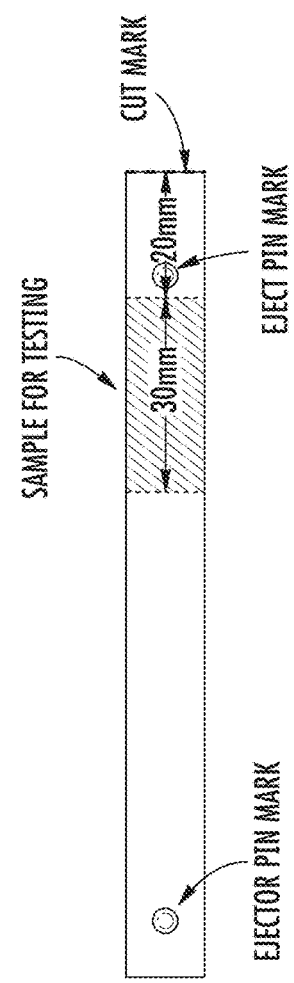
FIG. 13 illustrates the sample used in determination of melt strength and melt elongation of polyarylene sulfide compositions described herein.

Melt strength and melt elongation is performed on ARES-G2 equipped EVF fixture. The flame bar sample was cut as shown in FIG. 13. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance: The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat# 9464K57, A75). A flat Viton® fluoroelastomer (Purchased from McMaster-Carr, cat #86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

EXAMPLE 1

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Disulfide: 2,2-dithiodibenzoic acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 |  | 1.0 |
| Impact Modifier | main feed | 25.0 | 25.0 |
| Polyarylene Sulfide | main feed | 74.7 | 73.7 |
| Total |  | 100.0 | 100.0 |

Following formation, samples were tested for a variety of physical characteristics. Results are provided in Table 2, below.

TABLE 2

|  | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

|  | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

EXAMPLE 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

|  | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total |  | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

TABLE 5

|  | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |

TABLE 5-continued

|  | Sample 3 | Sample 4 | Sample 5 | Sample 6 | Sample 7 | Sample 8 | Sample 9 | Sample 10 |
|---|---|---|---|---|---|---|---|---|
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |

Samples were annealed at 230° C. for 2 hours and re-tested for physical characteristics. Results are provided in Table 6, below.

TABLE 6

|  | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

FIG. 14 illustrates the relationship of notched Charpy impact strength over temperature change for Sample 3 and for Sample 6. As can be seen, the polyarylene sulfide composition of Sample 6 exhibits excellent characteristics over the entire course of the temperature change, with a higher rate of increase in impact strength with temperature change as compared to the comparison material.

FIG. 15 is a scanning electron microscopy image of the polyarylene sulfide used in forming the sample 3 composition (FIG. 15A) and the Sample 6 composition (FIG. 15B). As can be seen, there is no clear boundary between the polyarylene sulfide and the impact modifier in the composition of FIG. 15B.

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

|  | Sample 3 | Sample 6 | Sample 10 |
|---|---|---|---|
| Initial properties | | | |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. | | | |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. | | | |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |
| Charpy notched impact strength at 23° C. (kJ/m$^2$) | 9.2 | 31.0 | 34.0 |
| Loss in Charpy notched impact strength (%) | 59 | 21 | 15 |

Figure 16:
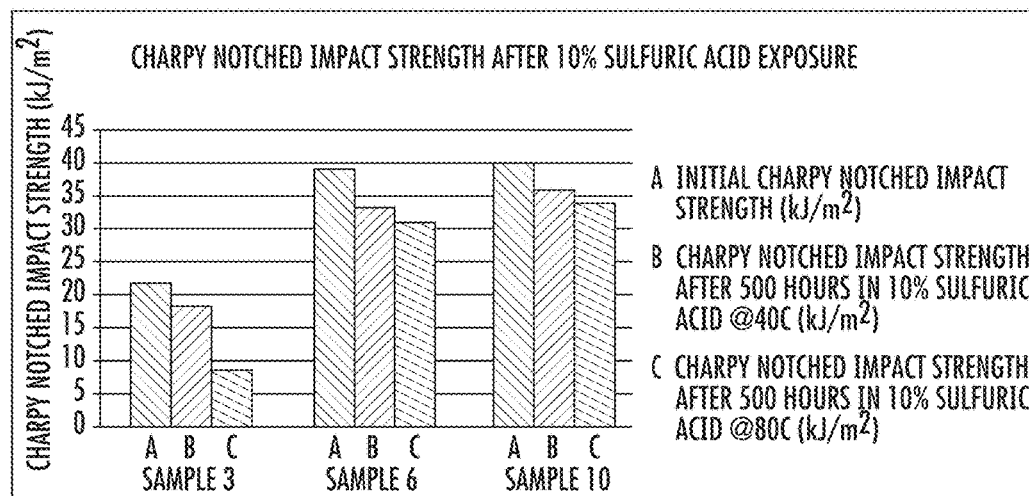
FIG. 16 compares the effect of sulfuric acid exposure on strength characteristics of polyarylene sulfide compositions as described herein and a comparison composition.

The results in the change in Charpy notched impact strength over time during exposure to the acid solution at an elevated temperature are illustrated in FIG. 16. As can be seen, the relative loss of strength of samples 6 and 10 is much less than the comparison sample.

EXAMPLE 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
|---|---|---|---|---|---|
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |
| Impact Modifier | main feed | 15.0 | 15.0 | 15.0 | 15.0 |
| Polyarylene Sulfide | main feed | 84.7 | 84.2 | 83.7 | 83.7 |
| Total | | 100.0 | 100.0 | 100.0 | 100.0 |

Following formation, tensile bars formed of the samples were tested for a variety of physical characteristics. Results are provided in Table 9, below.

TABLE 9

| | Sample 11 | Sample 12 | Sample 13 | Sample 14 |
|---|---|---|---|---|
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

EXAMPLE 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
|---|---|---|---|---|---|
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total | | 100.0 | 100.0 | 100.0 | 100.0 |

Following formation, tensile bars formed of the samples were tested for a variety of physical characteristics. Results are provided in Table 11, below.

TABLE 11

| | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

EXAMPLE 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total | | 100.0 | 100.0 | 100.0 | 100.0 | 100.0 |

Following formation, tensile bars formed of the samples were tested for a variety of physical characteristics. Results are provided in Table 13, below.

TABLE 13

| | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |
| Notched Izod Impact Strength at 23° C. (kJ/m$^2$) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

EXAMPLE 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

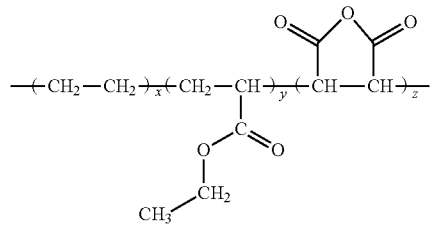

Crosslinking Agent: Hydroquinone
Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |
| Notched Charpy Impact Strength at 23° C. (kJ/m$^2$) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m$^2$) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

EXAMPLE 7

Materials utilized to form the compositions included the following:

Polyarylene sulfide:
PPS1—Fortron® 0203 linear polyphenylene sulfide available from Ticona Engineering Polymers of Florence, Ky.
PPS2—Fortron®0205 linear polyphenylene sulfide available from Ticona Engineering Polymers of Florence, Ky.
PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 | | 1.0 | | 1.0 | | 1.0 |
| Impact Modifier | main feed | 15.0 | 15.0 | 15.0 | 15.0 | 15.0 | 15.0 |
| PPS1 | main feed | 84.7 | 83.7 | | | | |
| PPS2 | main feed | | | 84.7 | 83.7 | | |
| PPS3 | main feed | | | | | 84.7 | 83.7 |
| Total | | 100.0 | 100.0 | 100.0 | 100.0 | 100.0 | 100.0 |

Following formation, samples were tested for a variety of physical characteristics. Results are provided in Table 17, below.

TABLE 17

| | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

EXAMPLE 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

EXAMPLE 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |
| Polyarylene Sulfide | main feed | 83.7 | 78.6 | 73.45 | 68.45 |
| Total | | 100.0 | 100.0 | 100.0 | 100.0 |

Following formation, samples were tested for a variety of physical characteristics. Results are provided in Table 21, below.

TABLE 21

| | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |

TABLE 21-continued

|  | Sample 41 | Sample 42 | Sample 43 | Sample 44 |
|---|---|---|---|---|
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |

Figure 17:
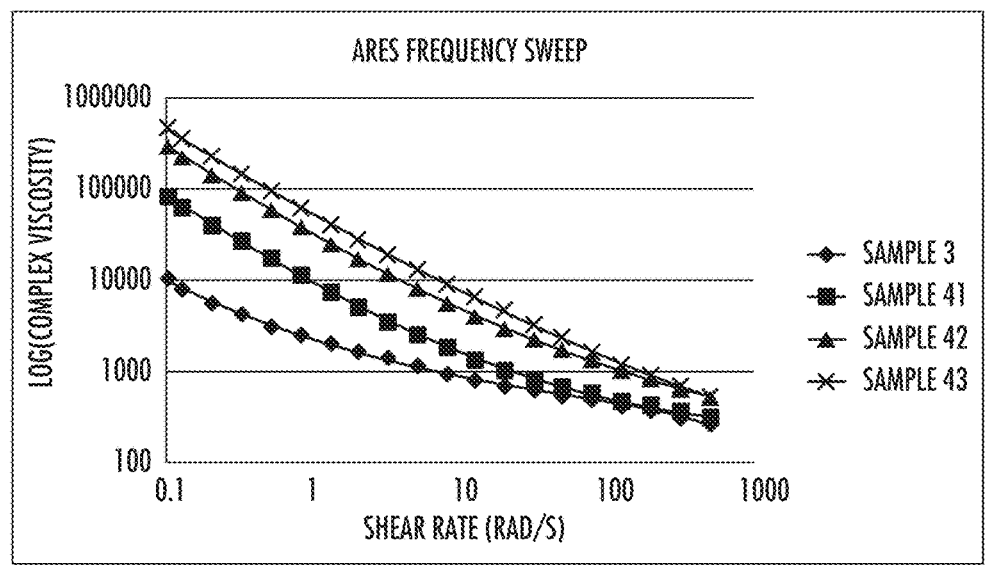
FIG. 17 provides the log of the complex viscosity obtained for polyarylene sulfide compositions described herein as a function of the shear rate.
Figure 18:
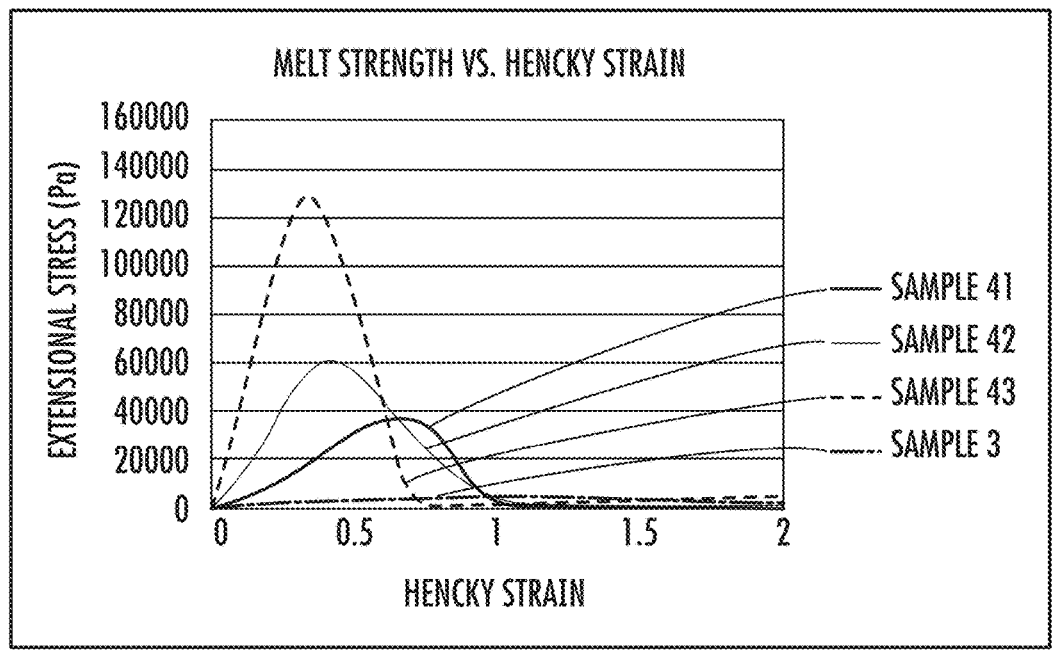
FIG. 18 provides the melt strength of polyarylene sulfide compositions described herein as a function of the Hencky strain.
Figure 19:
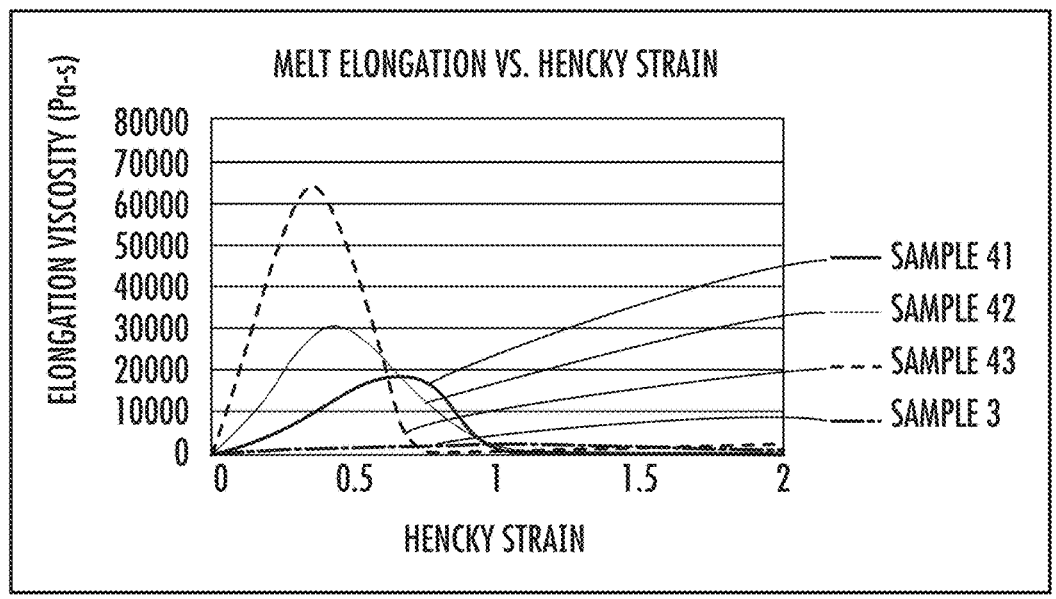
FIG. 19 provides the melt elongation for polyarylene sulfide compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 17, FIG. 18, and FIG. 19.

EXAMPLE 10

Figure 20:
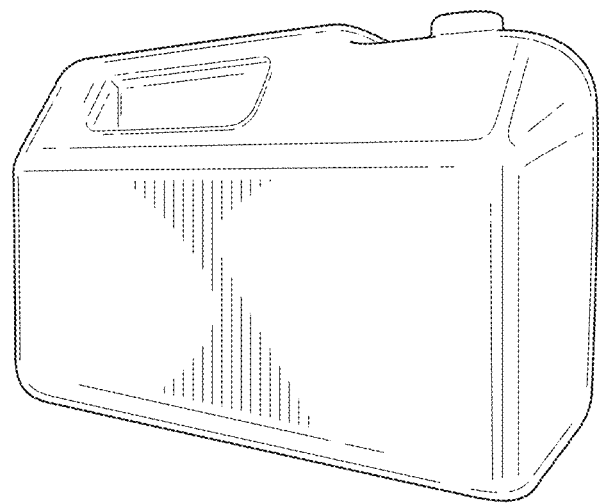
FIG. 20 illustrates a blow molded container formed of the polyarylene sulfide composition.
Figure 21A:
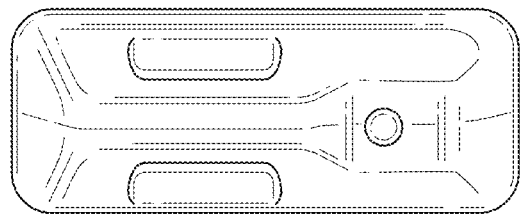
FIG. 21A and FIG. 21B are cross sectional images of the container shown in FIG. 20.
Figure 21B:
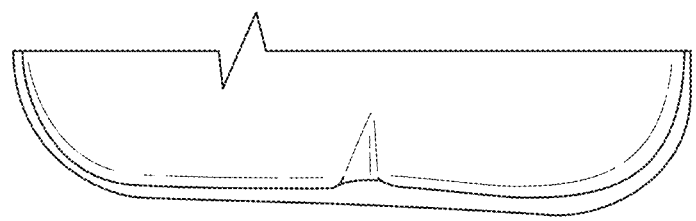

Sample 42 described in Example 9 was utilized to form a blow molded 1.6 gallon tank. The formed tank is illustrated in FIG. 20. Cross sectional views of the tank are presented in FIG. 21A and FIG. 21B. The formed tank has a good outer surface with regard to both visual inspection and feel. As shown in FIG. 21A, an even wall thickness (about 3 mm) was obtained and minimal sag was observed. As shown in FIG. 21B, the pinch-offs formed an excellent geometry.

EXAMPLE 11

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m$^2$) |
|---|---|---|
| CE10 | | |
| Aluminum blank-1 | 1.50 | 0.00418 |
| Aluminum blank-2 | 1.50 | 0.00418 |
| Sample No. 4-1 | 1.47 | 0.00418 |
| Sample No. 4-2 | 1.45 | 0.00418 |
| Sample No. 41-1 | 1.47 | 0.00418 |
| Sample No. 41-2 | 1.49 | 0.00418 |
| Sample No. 42-1 | 1.47 | 0.00418 |
| Sample No. 42-2 | 1.46 | 0.00418 |
| Sample No. 43-1 | 1.45 | 0.00418 |
| Sample No. 43-2 | 1.47 | 0.00418 |
| CM15A | | |
| Aluminum blank-1 | 1.50 | 0.00418 |
| Aluminum blank-2 | 1.50 | 0.00418 |
| Sample No. 4-1 | 1.48 | 0.00418 |
| Sample No. 4-2 | 1.49 | 0.00418 |
| Sample No. 41-1 | 1.49 | 0.00418 |
| Sample No. 41-2 | 1.50 | 0.00418 |
| Sample No. 42-1 | 1.47 | 0.00418 |
| Sample No. 42-2 | 1.48 | 0.00418 |
| Sample No. 43-1 | 1.46 | 0.00418 |
| Sample No. 43-2 | 1.47 | 0.00418 |
| Methanol | | |
| Aluminum blank-1 | 1.50 | 0.00418 |
| Aluminum blank-2 | 1.50 | 0.00418 |
| Sample No. 4-1 | 1.49 | 0.00418 |
| Sample No. 4-2 | 1.49 | 0.00418 |
| Sample No. 41-1 | 1.49 | 0.00418 |
| Sample No. 41-2 | 1.51 | 0.00418 |
| Sample No. 42-1 | 1.48 | 0.00418 |
| Sample No. 42-2 | 1.47 | 0.00418 |
| Sample No. 43-1 | 1.47 | 0.00418 |
| Sample No. 43-2 | 1.48 | 0.00418 |

Figure 22:
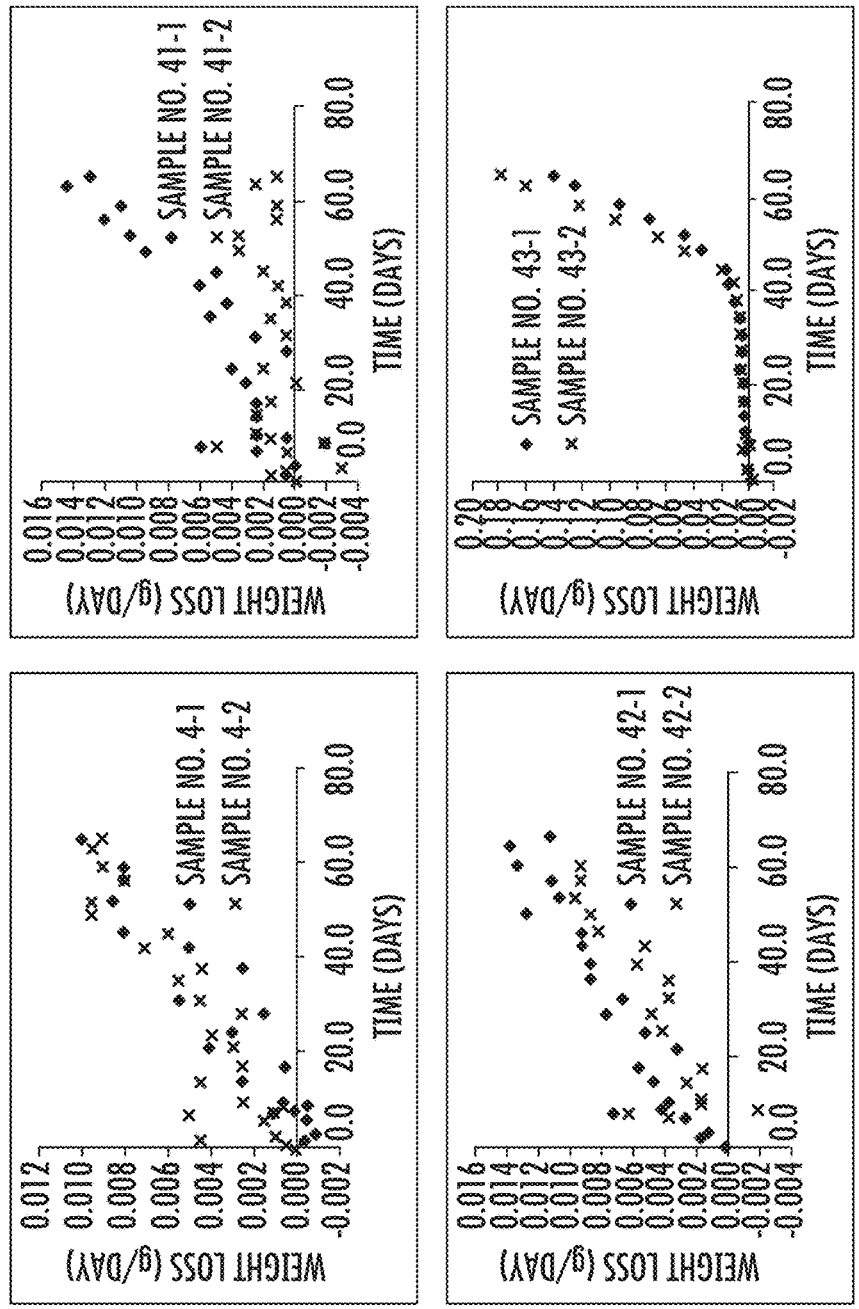
FIG. 22 illustrates the daily weight loss for testing samples in determination of permeation resistance of polyarylene sulfide compositions to CE10 fuel blend.
Figure 23:
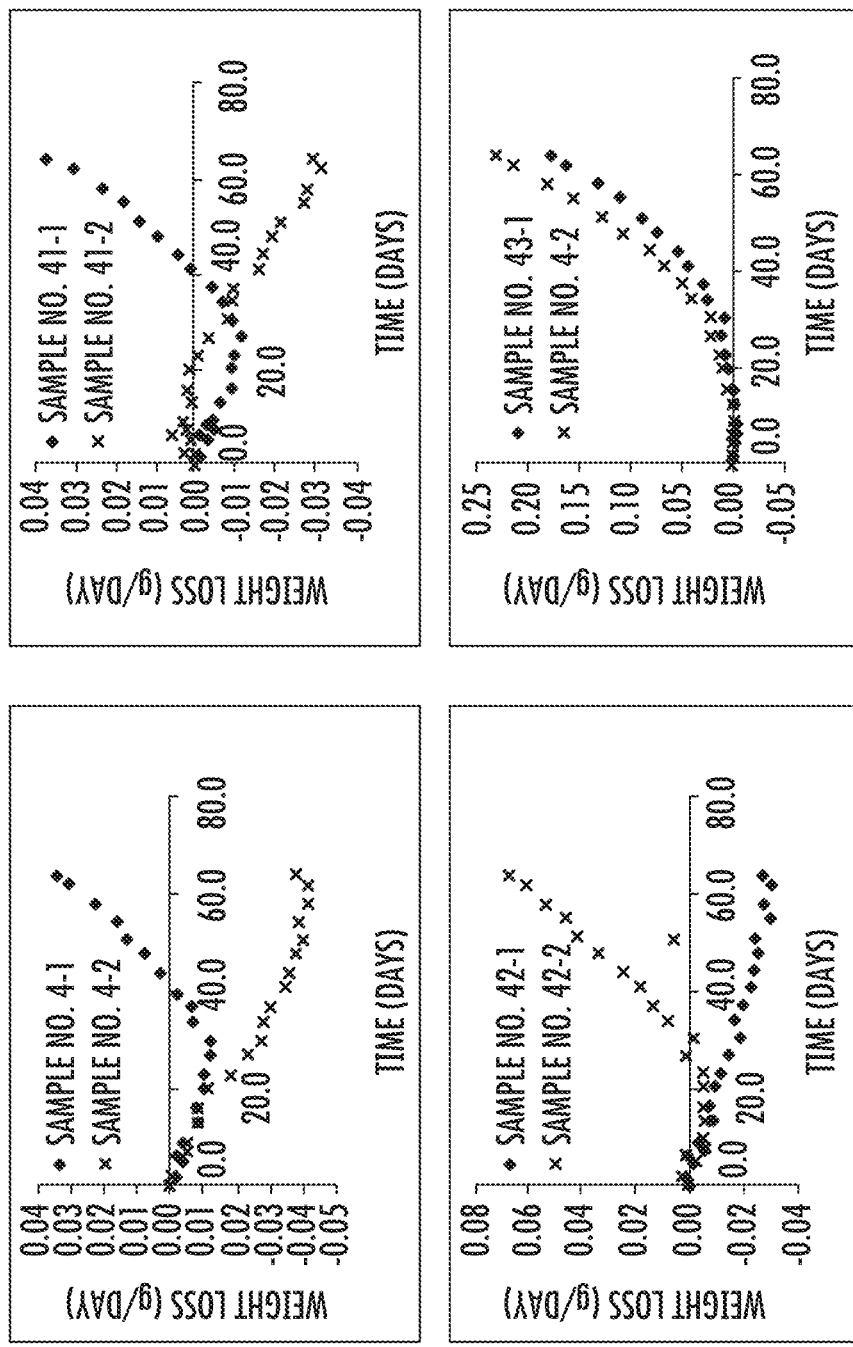
FIG. 23 illustrates the daily weight loss for testing samples in determination of permeation resistance of polyarylene sulfide compositions to CM15A fuel blend.
Figure 24:
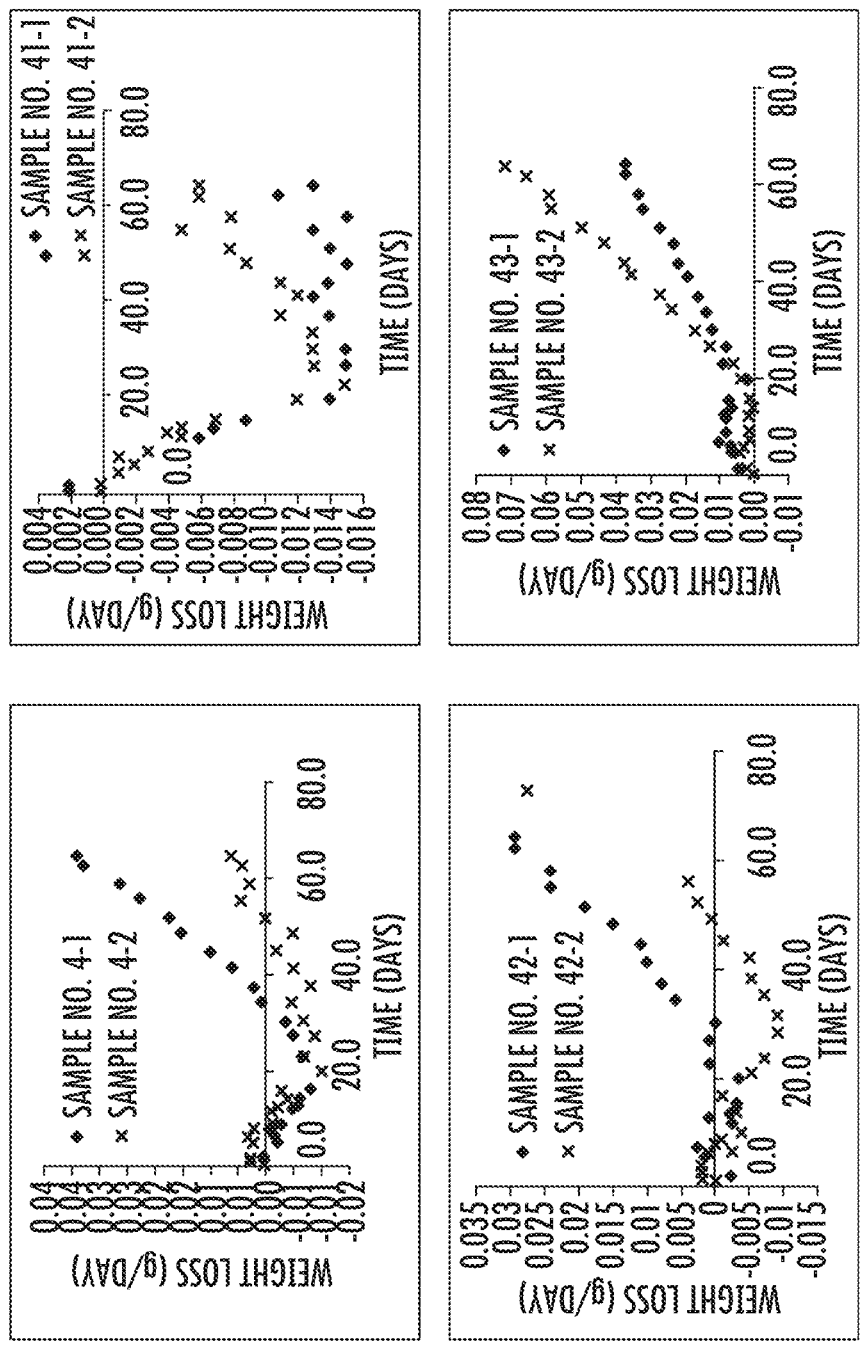
FIG. 24 illustrates the daily weight loss for testing samples in determination of permeation resistance of polyarylene sulfide compositions to methanol.

The daily weight losses for each material and each fuel are shown in FIGS. 22-24. Specifically, FIG. 22 shows the daily weight loss for the samples during the permeation test of CE10, FIG. 23 shows the daily weight loss for the samples during the permeation test of CM15A, and FIG. 24 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m$^2$) | Average Normalized permeation (g-mm/day-m$^2$) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |

TABLE 23-continued

| Sample | Normalized permeation (g-mm/day-m²) | Average Normalized permeation (g-mm/day-m²) | Permeation - 3 mm thickness | Average Permeation - 3 mm thickness |
|---|---|---|---|---|
| CM15A | | | | |
| Sample No. 4-1 | 0.49 | 0.18 ± 0.44 | 0.16 | 0.06 ± 0.15 |
| Sample No. 4-2 | −0.13 | | −0.04 | |
| Sample No. 41-1 | 0.50 | 0.11 ± 0.55 | 0.17 | 0.04 ± 0.18 |
| Sample No. 41-2 | −0.27 | | −0.09 | |
| Sample No. 42-1 | −0.13 | 0.27 ± 0.58 | −0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A heavy duty truck component comprising a polyarylene sulfide composition, the polyarylene sulfide composition of the heavy duty truck component being formed by melt processing (i) a linear polyarylene sulfide containing less than about 1 mol. % of cross-linking units based on the total monomer units of the polyarylene sulfide, (ii) from 20 wt. % to 35 wt. % of an epoxy-functionalized impact modifier, and (iii) from 1.0 wt. % to 1.75 wt. % of a polyfunctional crosslinking agent that includes a dicarboxylic acid, wherein the crosslinking agent is supplied following distribution of the impact modifier with the polyarylene sulfide, and wherein the melt processing forms a crosslinked epoxy-functionalized impact modifier that is a reaction product of epoxy-functionalized monomer units and a polyfunctional crosslinking agent, wherein the polyarylene sulfide composition exhibits an elongation at break of 70% or more as determined in accordance with ISO Test No. 527 at a temperature of 23° C. and at a speed of 50 mm/min.

2. The heavy duty truck component of claim 1, wherein the polyarylene sulfide composition has a notched Charpy impact strength of greater than about 10 kJ/m² as measured according to ISO Test No. 179-1 a temperature of 23° C.

3. The heavy duty truck component of claim 1, wherein the polyarylene sulfide is polyphenylene sulfide.

4. The component of claim 1, wherein the composition further comprises a filler, UV stabilizer, heat stabilizer, lubricant, colorant, or a combination thereof.

5. The heavy duty truck component of claim 1, wherein a first section of the component comprises the polyarylene sulfide composition, the first section being adjacent to a second section of the component that does not comprise the polyarylene sulfide composition.

6. The heavy duty truck component of claim 1, wherein the composition is free of plasticizers.

7. A heavy duty truck comprising the heavy duty truck component of claim 1.

8. The heavy duty truck component of claim 1, wherein the polyarylene sulfide composition has a notched Charpy impact strength of greater than about 8 kJ/m² as measured according to ISO Test No. 179-1 a temperature of −30° C.

9. The heavy duty truck component of claim 1, wherein the polyarylene sulfide composition has an elongation at yield of greater than about 4.5% as determined according to ISO Test No. 527 at a temperature of 23° C. and a test speed of 5 mm/min.

10. The heavy duty truck component of claim 1, wherein the polyarylene sulfide composition has a tensile strength at break of greater than about 30 MPa as measured according to ISO Test No. 527 at a temperature of 23° C. and a test speed of 5 mm/min.

11. The heavy duty truck component of claim 1, wherein the polyarylene sulfide composition has a tensile modulus of less than about 3000 MPa as measured according to ISO Test No. 527 at a temperature of 23° C. and a test speed of 5 mm/min.

12. The heavy duty truck component of claim 1, wherein the polyarylene sulfide composition has a halogen content of less than about 1000 ppm.

13. The heavy duty truck component of claim 1, wherein the polyarylene sulfide composition exhibits a permeation resistance to a fuel or a fuel source of less than about 3 g-mm/m²-day as determined according to SAE Testing Method No. J2665.

14. The heavy duty truck component of claim 1, wherein the epoxy-functionalized impact modifier includes methacrylic monomer units.

15. The heavy duty truck component of claim 14, the epoxy-functionalized impact modifier further includes a-olefin monomer units.

16. The heavy duty truck component of claim 1, wherein the dicarboxylic acid includes terephthalic acid.

17. The heavy duty truck component of claim 1, wherein the epoxy-functionalized monomer units include epoxy-functionalized methacrylic monomer units.

18. The heavy duty truck component of claim 1, wherein polyarylene sulfides constitute from about 20% wt. % to about 78.6 wt. % by weight of the composition.

19. The heavy duty truck component of claim 1, wherein the polyarylene sulfide is functionalized.

20. The heavy duty truck component of claim 19, wherein the functionalized polyarylene sulfide is a reaction product of a polyarylene sulfide and a disulfide compound having a reactive functionality.

21. The heavy duty truck component of claim 1, wherein the component includes a tubular member.

22. The heavy duty truck component of claim 1, wherein the component contains an inner layer and an outer layer, at least one of the layers containing the polyarylene sulfide composition.

23. The heavy duty truck component of aim 22, wherein the inner layer contains the polyarylene sulfide composition.

24. The heavy duty truck component of claim 22, wherein the outer layer contains the polyarylene sulfide composition.

25. The heavy duty component of claim 1, wherein the component is an engine block.

26. The heavy duty component of claim 1, wherein the component is an air system coupling.

27. The heavy duty component of claim 1, wherein the component is a urea tank.

28. The heavy duck truck component of wherein the component is an exhaust line.

29. The heavy duck truck component of claim 1, wherein the component is a coiled hose.

30. The heavy duty truck component of claim 1, wherein the polyarylene sulfide composition has a notched Charpy impact strength of greater than about 15 kJ/m$^2$ as measured according to ISO Test No. 179-1 a temperature of 23° C.

31. The heavy duty truck component of claim 1, wherein the polyarylene sulfide composition exhibits an elongation at break of about 80% or more as determined in accordance with ISO Test No. 527 at a temperature of 23° C. and at a speed of 50 mm/min.

* * * * *